US008847712B2

(12) United States Patent
Chen et al.

(10) Patent No.: US 8,847,712 B2
(45) Date of Patent: Sep. 30, 2014

(54) RECEPTACLE TYPE GROUND FAULT CIRCUIT INTERRUPTER WITH REVERSE WIRE PROTECTION

(71) Applicant: Ze Chen, Yueqing (CN)

(72) Inventors: Ze Chen, Yueqing (CN); Gui Chen, Yueqing (CN); Fengming Li, Tianjin (CN)

(73) Assignee: Ze Chen, Yueqing (CN)

( * ) Notice: Subject to any disclaimer, the term of this patent is extended or adjusted under 35 U.S.C. 154(b) by 160 days.

(21) Appl. No.: 13/646,622

(22) Filed: Oct. 28, 2012

(65) Prior Publication Data

US 2013/0038968 A1 Feb. 14, 2013

Related U.S. Application Data

(63) Continuation-in-part of application No. 13/469,342, filed on May 11, 2012.

(30) Foreign Application Priority Data

Jul. 18, 2011 (CN) .......................... 2011 1 0200616
Sep. 6, 2011 (CN) .......................... 2011 1 0262191
Feb. 4, 2012 (CN) .......................... 2012 1 0024531

(51) Int. Cl.
*H02H 3/00* (2006.01)
*H02H 9/08* (2006.01)
*H01H 73/12* (2006.01)
*H01H 73/00* (2006.01)
*H01H 83/06* (2006.01)

(52) U.S. Cl.
USPC ............................................... 335/18; 361/49

(58) Field of Classification Search
USPC ........................................ 335/18; 361/42–50
See application file for complete search history.

(56) References Cited

U.S. PATENT DOCUMENTS

| | | | | |
|---|---|---|---|---|
| 4,001,652 | A * | 1/1977 | Klein et al. | 361/728 |
| 5,541,800 | A * | 7/1996 | Misencik | 361/45 |
| 6,828,886 | B2 * | 12/2004 | Germain et al. | 335/18 |
| 6,954,125 | B2 * | 10/2005 | Wu et al. | 335/18 |
| 7,889,466 | B2 * | 2/2011 | Chan et al. | 361/45 |
| 7,936,238 | B1 * | 5/2011 | Weeks et al. | 335/18 |
| 8,335,062 | B2 * | 12/2012 | Haines et al. | 361/42 |
| 2004/0070474 | A1 * | 4/2004 | Wu et al. | 335/18 |
| 2007/0030608 | A1 * | 2/2007 | Baldwin et al. | 361/42 |
| 2010/0254049 | A1 * | 10/2010 | Yue et al. | 361/42 |
| 2010/0259347 | A1 * | 10/2010 | Ziegler et al. | 335/14 |

* cited by examiner

*Primary Examiner* — Alexander Talpalatski
(74) *Attorney, Agent, or Firm* — Mei & Mark LLP

(57) ABSTRACT

A ground fault circuit interrupter comprises a reset key, a reset locking mechanism, a reset mechanism, a reset bracket, a bracket reset mechanism, a bracket homing mechanism, a reset linkage mechanism, and a reset linkage clutching mechanism. A conductive assembly is configured to selectively connect or disconnect electrical continuity between the power input side and the load side. The conductive assembly comprises pairs of short-circuit conductive strips with conductive movable contacts, power input connection assemblies with input conductive stationary contacts, wiring output assemblies, receptacle output assemblies with output stationary contacts, and a first short-circuit conductor and a second short-circuit conductor. A reverse wiring protection device comprises an electromagnetic generating device having a power supply sub-circuit and an electromagnetic actuator bracket configured to selectively close first normally open switch and second normally open switch and further configured to open first normally closed switch and second normally closed switch.

18 Claims, 29 Drawing Sheets

RECEPTACLE TYPE GROUND FAULT CIRCUIT INTERRUPTER WITH REVERSE WIRE PROTECTION

This application claims the benefit of priority of Chinese Patent Applications 201110200616.X filed Jul. 18, 2011, 201110262191.5 filed Sep. 6, 2011, and 201210024531.5 filed Feb. 4, 2012, the contents of which are incorporated herein by reference in their entirety. This application is also a continuation-in-part (CIP) of U.S. application Ser. No. 13/469,342 filed May 11, 2012, incorporated herein by reference in its entirety.

TECHNICAL FIELD

The present disclosure relates generally to receptacle type ground fault circuit interrupters. More specifically, the disclosure relates to GFCIs with reverse wire protection that cannot be reset in a reverse wire or trip condition.

BACKGROUND

Since receptacle type ground fault circuit interrupters ("GFCI") can not only supply power to the load through the sockets on the upper cover but also can supply power through the load connection assembly to the load connected on it, it is used extensively. The specific structure of the current receptacle type ground fault circuit interrupter generally includes shell, leakage signal detection circuit, electromagnetic tripping mechanism that acts as controlled by the said leakage signal detection circuit, reset key, reset mechanism, grounding assembly, and conductive assembly from power input side to load side. The conductive assembly from power input side to load side includes power input connection assembly and load connection assembly. The load connection assembly includes wiring output assembly and receptacle output assembly.

The said reset mechanism includes a reset bracket. The reset bracket is under the action of the reset key and electromagnetic tripping mechanism. The reset bracket controls a pair of movable contacts in the conductive assembly to connect or disconnect the electrical connection from the power input connection assembly to the load end. However, because the pair of movable contacts of the current GFCI is provided at the free end of a pair of conductors in the conductive assembly and while the other end of the conductor is fixed, and also because the requirements for machining precision of the components are relatively high and the stability of product quality is not ideal, the two moveable contacts are prone to unreliable contact, causing that the receptacle type ground fault circuit interrupter cannot work normally.

In addition, as the power input connection assembly is very similar to the load connection assembly in the current GFCI, reverse connection of power supply wire and load wire often occurs during the installation and utilization. In that case, the GFCI acts only as a normal receptacle with no leakage protection function, and the hidden trouble of electric shock that may cause personal injury and property damage exists. For this reason, now many countries and regions require that, in case of reverse connection of the power supply line and load connection assembly, the receptacle type ground fault circuit interrupter should be unresettable and there should be no power output even when the reset key is pressed forcefully in order to prevent hidden safety trouble and to ensure personal and property safety.

SUMMARY

The disclosed structure aims to overcome the shortage of the current technology and to provide a receptacle type ground fault circuit interrupter with simple structure, reliable contact and reverse wiring protection function.

A ground fault circuit interrupter for a receptacle having a power input side and a load side may comprise some or all of the following:

A reset key may have a pressing direction, the reset key comprising a reset locking mechanism having a motion trail that intersects with a central longitudinal axis of an electromagnetic tripping iron core. A reset mechanism may comprise a reset bracket comprising a first guide slot on a first side and a second guide slot on a second side. A bracket reset mechanism may comprise at least one support spring and a bracket homing mechanism that is biased to push the reset bracket in a sliding direction in to a first position. A reset linkage mechanism may be between the reset key and the reset bracket, the reset linkage mechanism may be configured to link a reset homing action and the sliding of the reset bracket. A reset linkage clutching mechanism may be configured to control the reset linkage mechanism when the interrupter resets. An electromagnetic tripping mechanism, may comprise a coil rack with a central hole, an electromagnetic tripping coil wound around the coil rack, the electromagnetic tripping iron core, and an iron core reset spring.

A conductive assembly may be configured from the power input side to the load side, the conductive assembly may be configured to selectively connect or disconnect electrical continuity between the power input side and the load side. The conductive assembly may comprise a pair of short-circuit conductive strips, each strip having a conductive movable contact. A pair of power input connection assemblies may each comprise an input conductive stationary contact configured opposite to the conductive movable contacts of the short-circuit conductive strips. The conductive assembly may comprise a pair of wiring output assemblies, a pair of receptacle output assemblies, each receptacle output assembly having an output stationary contact, and a first short-circuit conductor and a second short-circuit conductor between the pair of short-circuit conductive strips and the pair of receptacle output assemblies.

A reverse wiring protection device may comprise an electromagnetic generating device having a power supply subcircuit configured with a reed switch connected in series. An electromagnetic actuator bracket may have a pair of conductive pads, each pad having a movable contact, configured to selectively electrically connect and disconnect to the pair of output stationary contacts. The reverse wiring protection device may comprise an actuator bracket homing mechanism, and a normally open holding switch connected in parallel with the reed switch, and linked with the electromagnetic actuator bracket.

The electromagnetic tripping iron core and the iron core reset spring may be positioned in the central hole of the coil rack with a clearance fit. The electromagnetic tripping iron core may be configured to slide perpendicular to the pressing direction of the reset key. The reset locking mechanism may fit with an end of the electromagnetic tripping iron core. The electromagnetic generating device may control the electromagnetic actuator bracket to selectively disconnect the movable contacts of the conductive pads from the pair of output stationary contacts.

Under the influence of one or more of the reset key, bracket reset mechanism, bracket homing mechanism, and the electromagnetic tripping mechanism, the reset bracket may be configured to slide between a first position and a second position to control the selectivity of the conductive assembly. The reset bracket may mounted to slide in a plane perpendicular to the pressing direction of the reset key.

One of the pair of short-circuit conductive strips may be held in the first guide slot of the reset bracket and the other of the pair of short-circuit conductive strips may be held in the second guide slot of the reset bracket so that when the reset bracket slides from the first position to the second position the movable contacts of the pair of short circuit conductive strips move from the first position that disconnects electrical continuity between the power input side and the load side to the second position that connects electrical continuity between the power input side and the load side. The conductive movable contacts may be configured respectively on the pair of short-circuit conductive strips facing the second position. The at least one support spring may be positioned between the reset bracket and the side of the short-circuit conductive strip without the conductive movable contacts.

The pair of power input connection assemblies may be on one side of the reset bracket and the pair of wiring output assemblies and the pair of receptacle output assemblies may be on a second side of the reset bracket. A portion of the pair of wiring output assemblies, through the second short-circuit conductor, at least one of the pair of conductive pads and at least one of the pair of the receptacle output assemblies, may be configured to form a selective electrical connection.

The actuator bracket homing mechanism may be configured to keep the movable contacts of the pair of conductive pads in a normally-closed state with the output stationary contacts of the pair of receptacle output assemblies.

At least a portion of the power supply sub-circuit of the electromagnetic generating device may bridge over the wiring output assembly, the reed switch of the power supply sub-circuit may link with the reset key, and the reed switch of the power supply sub-circuit may close in the tripped state and open in the reset state and in the resetting process.

A ground fault circuit interrupter may also comprise a reset key, a reset locking mechanism, a reset mechanism, a reset bracket, a bracket reset mechanism, a bracket homing mechanism, a reset linkage mechanism, and a reset linkage clutching mechanism. A conductive assembly is configured to selectively connect or disconnect electrical continuity between the power input side and the load side. The conductive assembly comprises pairs of short-circuit conductive strips with conductive movable contacts, power input connection assemblies with input conductive stationary contacts, wiring output assemblies, receptacle output assemblies with output stationary contacts, and a first short-circuit conductor and a second short-circuit conductor. A reverse wiring protection device comprises an electromagnetic generating device having a power supply sub-circuit and an electromagnetic actuator bracket configured to selectively close first normally open switch and second normally open switch and further configured to open first normally closed switch and second normally closed switch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

The receptacle type ground fault circuit interrupter includes reset key 4 and reset mechanism, conductive assembly from power input side to load side, leakage signal detection circuit, and electromagnetic tripping mechanism 15 acting as controlled by the leakage signal detection circuit. On reset key 4, reset latching mechanism matching with the end of electromagnetic tripping iron core 151 is provided. Between the said reset key 4 and reset bracket 12, the reset linkage mechanism linking the reset key homing action and the sliding of reset bracket 12 to Position 1 is provided. Also the reset linkage clutching mechanism is provided. The said reset linkage clutching mechanism controls the said reset linkage mechanism to link when the interrupter resets.

Figure 1:
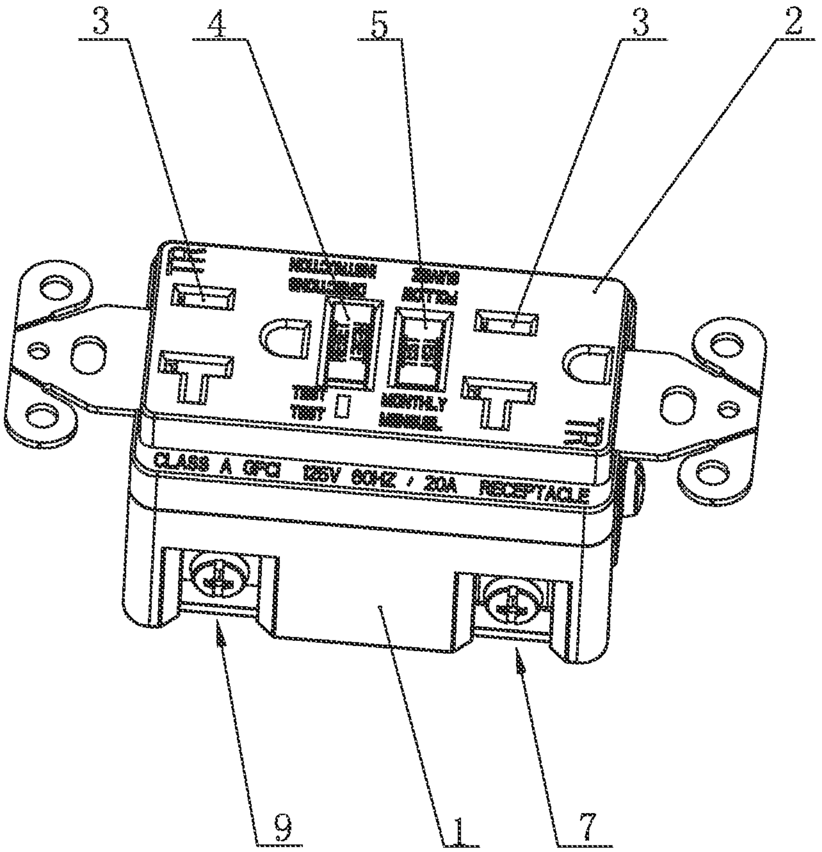
FIG. 1 is an external 3-dimensional diagram of an embodiment.
Figure 2:
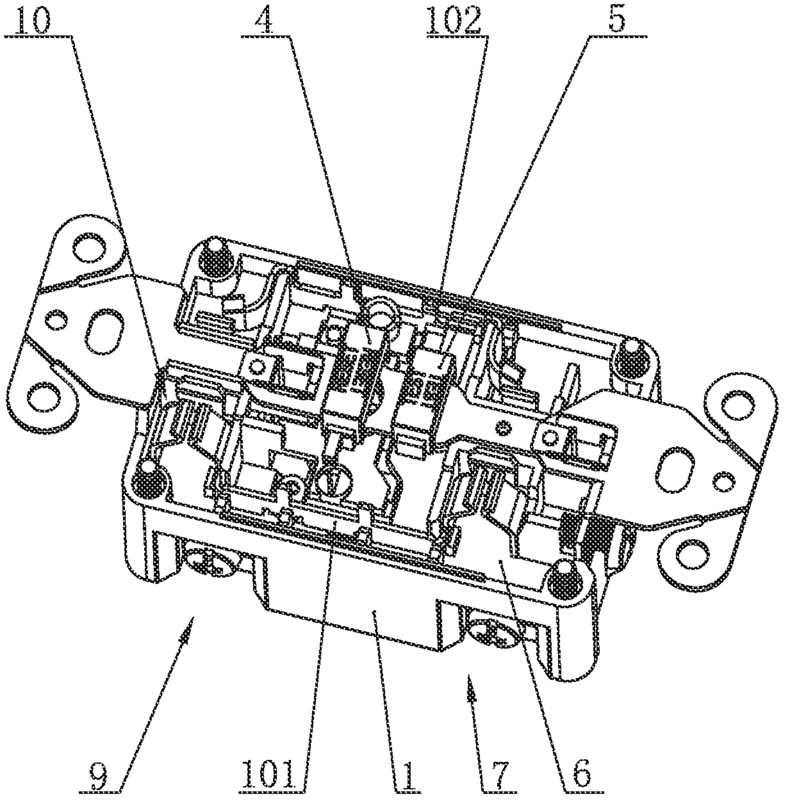
FIG. 2 is an internal structural diagram of an embodiment with the upper cover removed.
Figure 3:
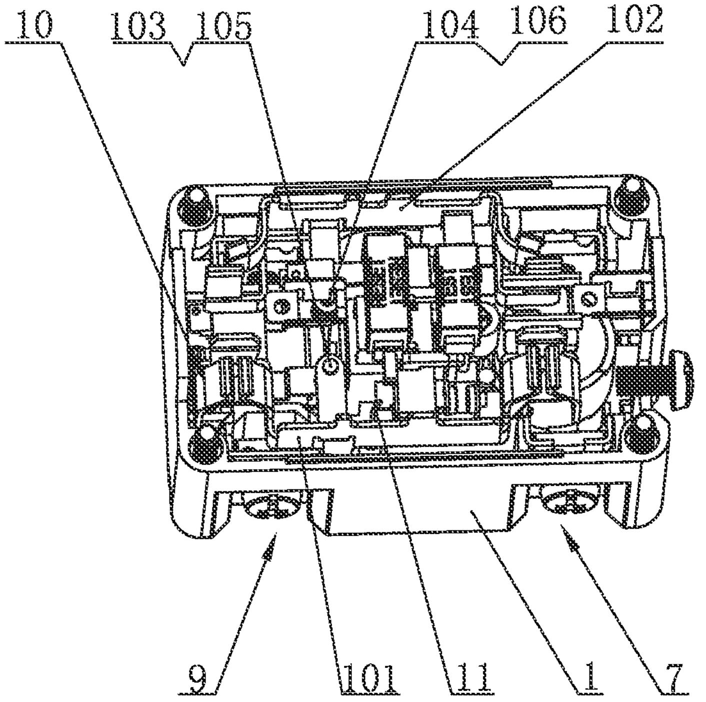
FIG. 3 is an internal structural diagram of an embodiment with the upper cover and grounding assembly removed.
Figure 4:
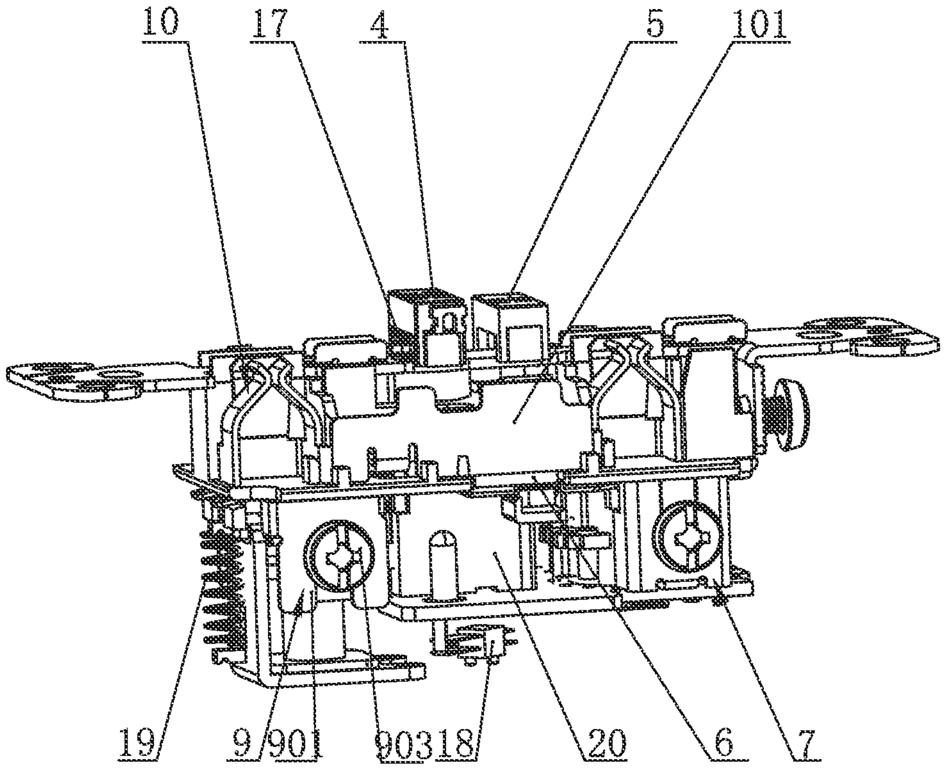
FIG. 4 is an internal structural diagram of an embodiment with the upper cover and base removed.
Figure 5:
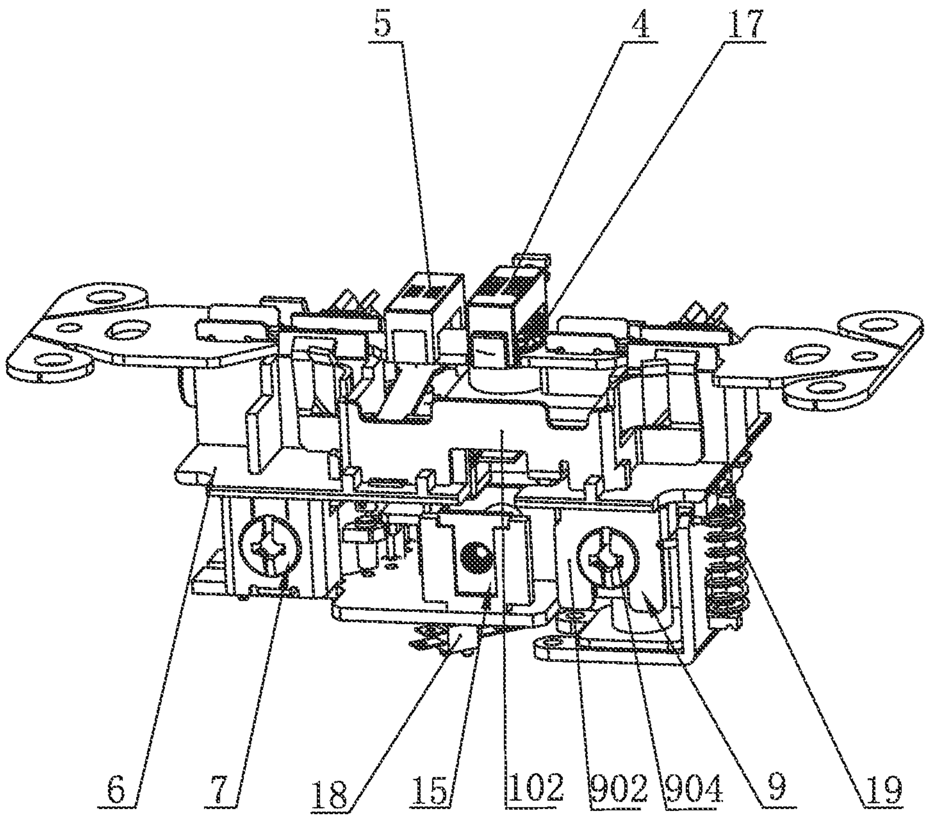
FIG. 5 is an internal structural diagram of the other side of the embodiment of FIG. 4 with the upper cover and base removed.

As shown in FIGS. 1-3, in this embodiment, the shell of the receptacle type ground fault circuit interrupter is a rectangular solid generally. The shell is composed of base 1 and upper cover 2. The upper cover 2 is provided with two groups of sockets 3, a reset key 4 and a test key 5. On the base 1, a middle frame 6 is provided. The said reset key 4 is provided with reset pole 14 which is vertically downward. The pressing direction of the reset key 4 and test key 5 is vertically downward, as shown in FIGS. 3-6.

Figure 7:
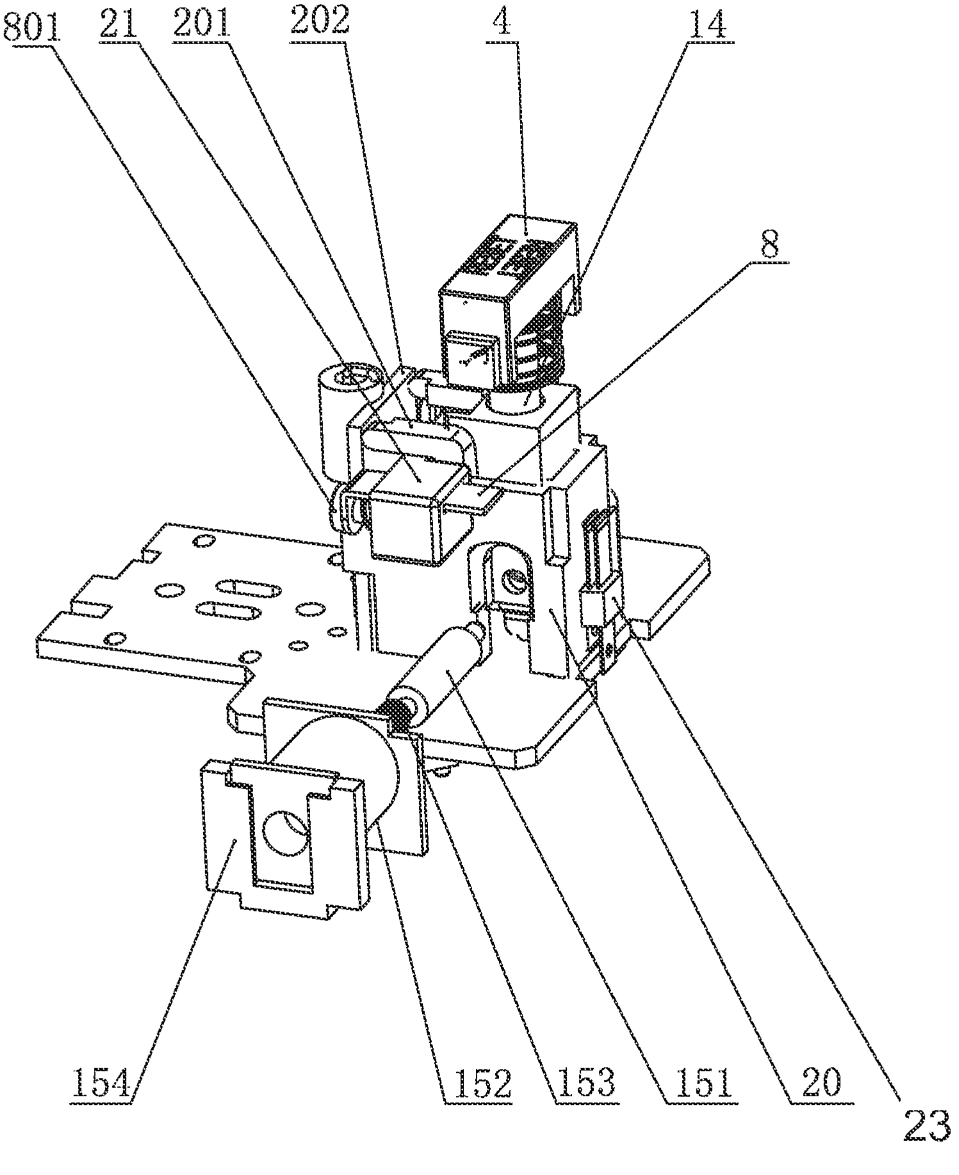
FIG. 7 is a structural diagram of the reset mechanism and electromagnetic tripping mechanism of an embodiment.
Figure 8:
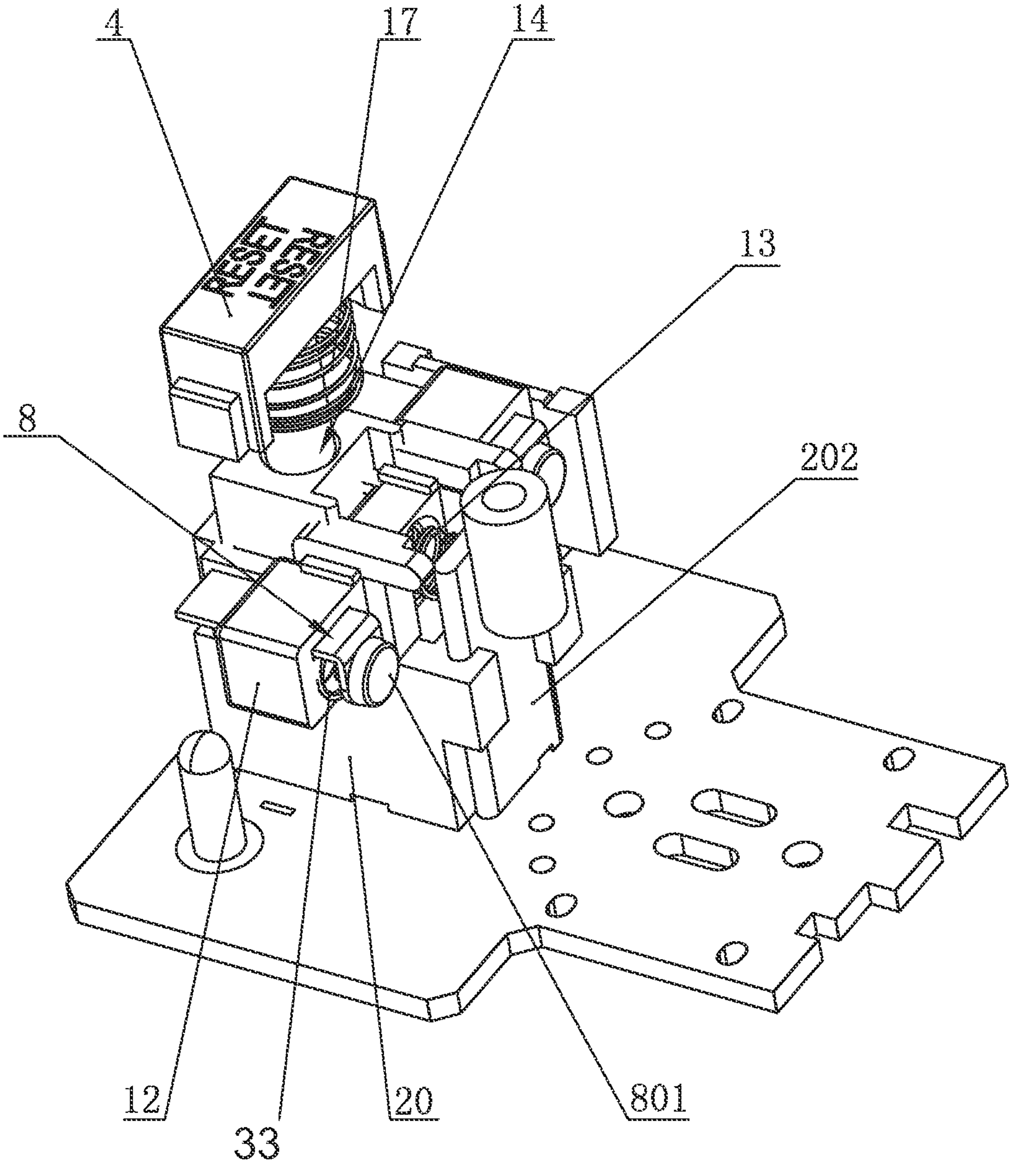
FIG. 8 is a structural diagram of the other side of FIG. 7.

The conductive assembly includes power input connection assembly 7, short-circuit conductive strip 8, wiring output assembly 9 and receptacle output assembly 10, which are provided in pairs. The first short-circuit conductor 11 is provided between the said short-circuit conductive strip 8 and receptacle output assembly 10 to form electrical connection, constituting electrical connection as shown in FIGS. 3, 7 & 8.

Figure 10:
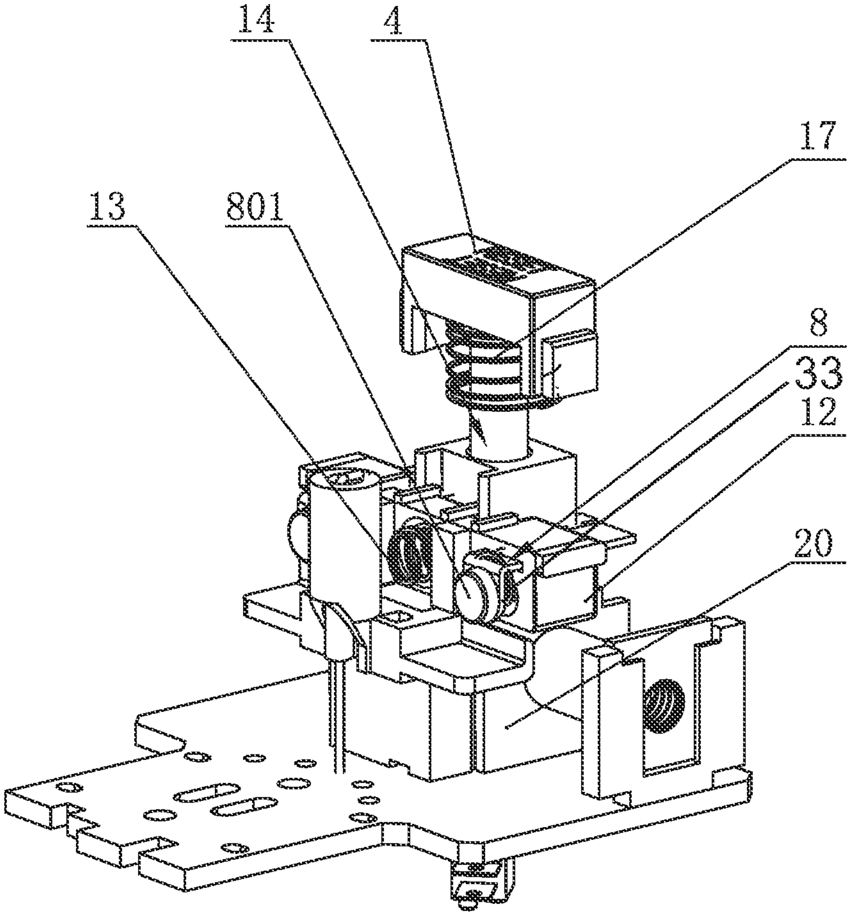
FIG. 10 is a diagram of another embodiment of the reset bracket seat.
Figure 11:
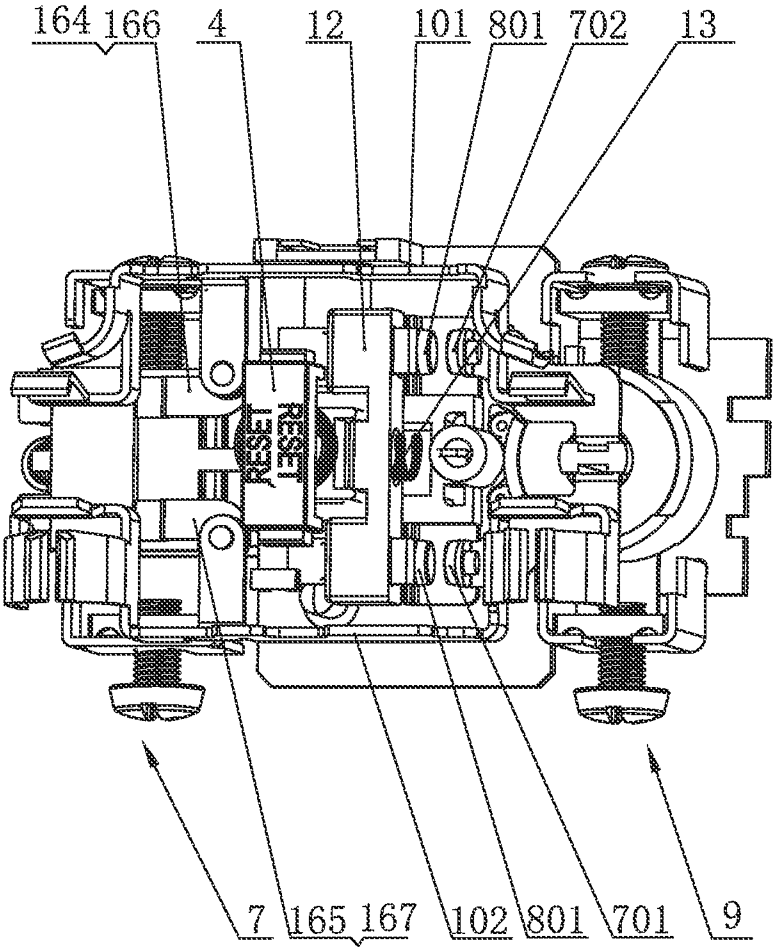
FIG. 11 is an internal structural top-view diagram of another embodiment with the upper cover removed.
Figure 23:
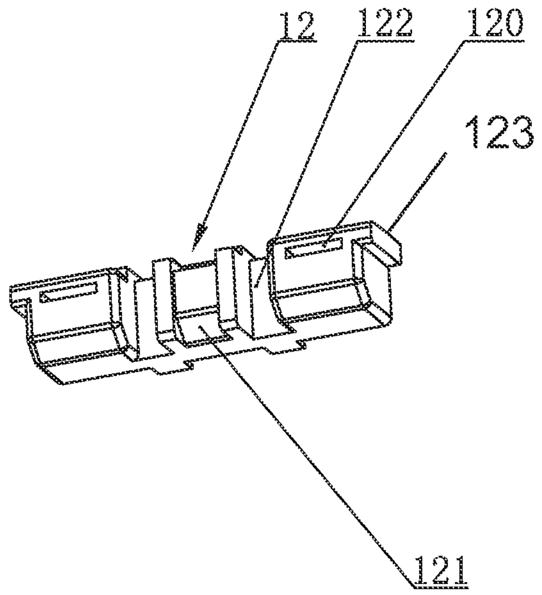
FIG. 23 is a structural diagram of a reset bracket embodiment.

The said reset mechanism includes reset bracket 12 and bracket homing mechanism. Under the action of reset key 4, bracket homing mechanism and electromagnetic tripping mechanism 15, the said reset bracket 12 has two positions, i.e. Position 1 in reset state (close state) and Position 2 in trip state (open state). The said reset bracket 12 controls the contact in the conductive assembly, thereby connecting or disconnecting the electrical connection from power input side to load side. As shown in FIGS. 7, 8, & 10, the reset bracket 12, along the horizontal direction and the length direction of the rectangular base 1, is installed slideably in base 1 of the receptacle type ground fault circuit interrupter and is below the reset key 4 in the side of the reset pole 14. The sliding direction of the reset bracket 12 is perpendicular to the pressing direction of the reset key 4. As shown in FIG. 23, the said reset bracket 12 is generally quadrangular. The slot 120 is composed of penetrating slot joints parallel with the sliding direction of the reset bracket 12. The slots 120 are provided in the two ends in the upper part of the reset bracket 12, close to the two sides of the long sides of the shell.

The pair of short-circuit conductive strips 8 are inserted in the slots 120 in the two sides respectively. The short-circuit conductive strips 8 are composed of strip-shaped sheets made of copper. A section of the short-circuit conductive strips 8 clearance-fit with slots 120, as shown in FIG. 8. One end of each short-circuit conductive strip 8 is bent downwards by 90° to a form ¬ shape, a shape having a vertex between two arms set ninety degrees apart. The short-circuit conductive strips 8 are clasped in the corresponding slots 120 with horizontal clearance fitting, allowing them to be able to slide along the sliding direction of reset bracket 12.

In this embodiment, flexible conductive wires are provided for electrical connection between the short-circuit conductive strips 8 and receptacle output assembly 10. One flexible conductive wire is the first short-circuit conductor 11. The short-circuit conductive strip 8 is provided with conductive movable contact 801 in the downward-bending part at the upper end in the side facing Position 1. In a space between the side of the short-circuit conductive strip 8 other than the side with conductive movable contact 801 provided and the side of reset bracket 12, support spring 13 is provided as elastic support. At least one other support spring can be between the reset bracket 12 and a block 21. And, as shown in FIG. 8, a short circuit conductive strip support spring 33 can placed between the short circuit conductive strips 8 and the reset bracket 12.

Figure 22:
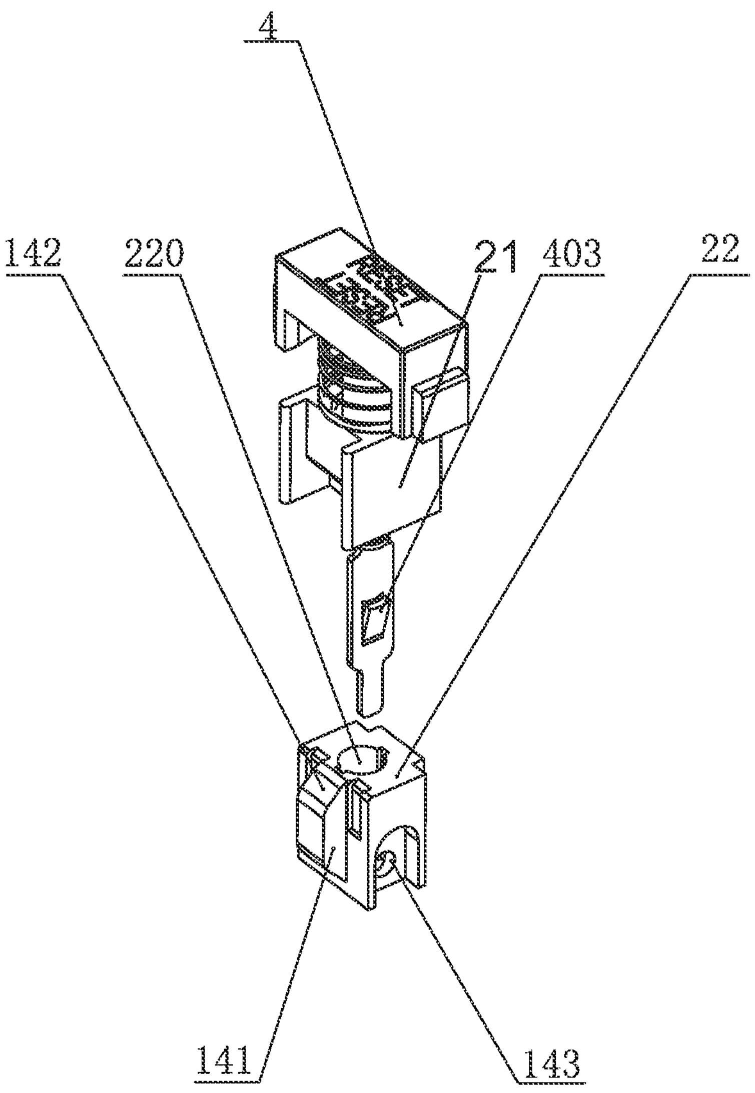
FIG. 22 is an exploded structural diagram of the reset key and reset sliding block of an embodiment.

As shown in FIG. 22, the said reset key 4 is provided with reset pole 14 extending vertically downward. The reset key 4 and reset pole 14 can be provided as an integral unit. In this embodiment, the upper part of reset pole 14 is a plastic cylinder, and the lower part is punched metal sheet. The upper part of reset pole 14 is covered with key reset spring 17. The lower end of the reset pole 14 penetrates middle frame 6. The upper end of the key reset spring 17 pushes against the reset key 4 and the lower end pushes against block 21 so that the reset key 4 has an upward force to form the reset mechanism. In the middle of the reset sliding block 22, cylindrical component with axial through-hole is provided. The block 21 can be formed integrally or separate from the middle frame 6.

On the upper end face of block 21 above reset sliding block 22, spring cavity 220 is provided. Compression spring 24 and block 21, and reset sliding block 22, in sequence, are covered over reset pole 14, and at least compression spring 24 is movable. The lower end of compression spring 24 is placed in spring cavity 220 and pushes against the upper end face of block 21. The upper end of compression spring 24 pushes against a lower face of the reset pole 14, constituting reset mechanism of the said reset sliding block 22 and allowing reset sliding block 22 to have a force to slide toward the reset key pressing direction.

On the said reset sliding block 22 on a side close to reset pole 14, and facing outwardly with respect to reset pole 14, a triangular projecting block 141 is provided. Projecting incline 142 is provided at the upper end of projecting block 141. The direction of the said incline 142 is slantwise facing the homing direction of reset key 4 (i.e. is slantwise upward). On the said reset bracket 12 at the position corresponding to projecting incline 142, reset incline 121 is provided. The said reset incline 121 is located on the motion trail of projecting incline 142. The said reset incline 121 corresponds to the said projecting incline, and the slope matches (i.e. is slantwise downward). Between the said reset sliding block 22 and reset pole 14, reset linkage mechanism is provided. Of course projecting block 141 can also be of another shape, such as an arc, as long as it has an incline matching or complementing the inclined side wall of reset incline 121.

The reset mechanism of reset sliding block 22 functions, in the tripped state, to prevent the projecting incline 142 on reset sliding block 22 from interacting with the reset incline 121 of reset bracket 12 to make it possible to isolate the conductive assembly from the power input side to the load side.

Figure 9:
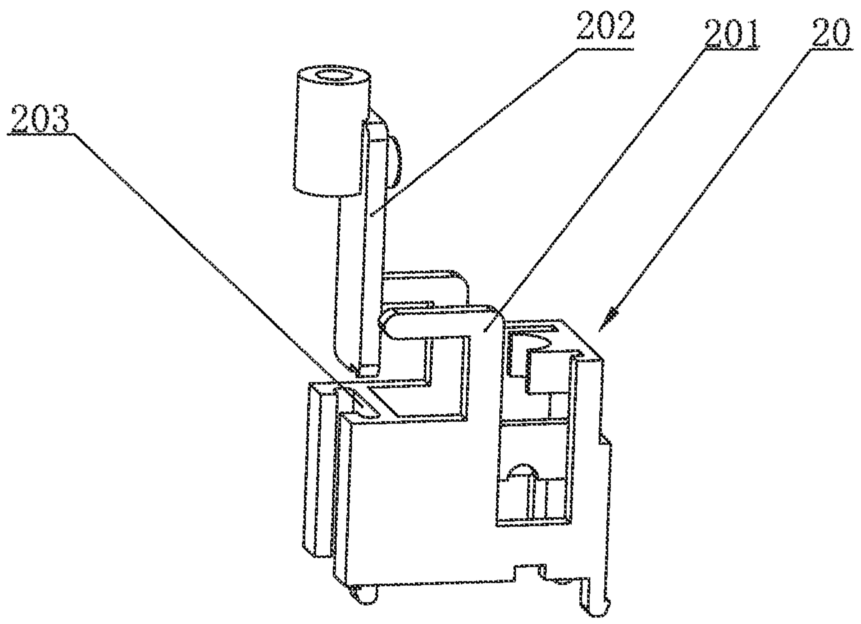
FIG. 9 is a structural diagram of an embodiment of the reset bracket seat.

In order that the reset bracket 12 could slide steadily, this receptacle type ground fault circuit interrupter is also provided with reset bracket seat 20. Between the said reset bracket and the reset bracket seat, guide mechanism is provided. As shown in FIG. 7-9, the said reset bracket seat 20 is generally a hollow rectangular solid enclosed with four vertical side walls. Reset sliding block 22 is placed inside it. The internal cavity of the said reset bracket seat 20 is sized to clearance-fit with reset sliding block 22, meanwhile acting to guide the reset sliding block 22. At least one clasping foot is provided at the bottom of the reset bracket seat 20, and is clasped at the bottom of the internal cavity of base 1.

On the top of the vertical wall of reset bracket seat 20, horizontal sliding face is provided. On the horizontal sliding face at the end close to Position 2 of reset bracket 12, a pair of "]"-shaped guide clips 201 are provided. The guide clips 201 comprise two arms at ninety degrees, with one arm parallel to the horizontal sliding face and the second arm perpendicular to the horizontal sliding face. The reset bracket 12 is provided slideably between the sliding face at the top of the reset bracket seat and the "]"-shaped guide clip 201. In the side of the reset bracket 12 at the two sides of the reset incline 121, guide slots 122 clearance-fitting with guide clip 201 are provided. The pair of "]"-shaped guide clips 201 are located in guide slot 122, constituting the guide mechanism for reset bracket 12.

At the other end of the horizontal sliding face, limit stop 202 is provided to limit the reset bracket 12 and to prevent the reset bracket 12 from sliding off. The limit stop 202 is generally of a long slat shape. On the reset bracket seat 20 in the end of the said horizontal sliding face close to Position 1 of reset bracket 12, a pair of vertical slots 203 are provided to match with the limit. The limit stop 202 is clearance-fit and inserted in the vertical slots 203, with the upper end exposed to form the limit. Between the upper end of the limit stop 202 and the said reset bracket 12, bracket reset spring 13 is provided so that reset bracket 12 could have a force to slide toward Position 2, constituting the bracket homing mechanism.

Figure 24:
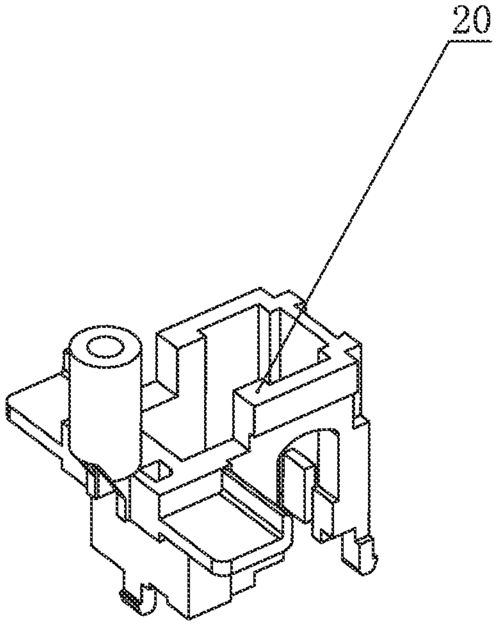
FIG. 24 is a structural diagram of a reset bracket of another embodiment.

As shown in FIGS. 22 & 24, at the position on the external wall of the said reset sliding block 22 corresponding to the motion trail of the said reset locking hole 401 along with the pressed reset key 4, linking hole 143 penetrating to the internal hole is provided. The said linking hole 143 is sized to clearance-fit with electromagnetic tripping iron core 151. The said electromagnetic tripping mechanism 15 is provided in the side of reset bracket seat 20, close to the middle of the long length of base 1. Electromagnetic tripping mechanism 15 includes tripping coil rack 154 and electromagnetic tripping coil 152 wound around it, electromagnetic tripping iron core 151 and iron core reset spring 153. The sliding direction of the said electromagnetic tripping iron core 151 is provided horizontally, and is perpendicular to the reset pole 14. Below reset locking hole 401, an incline 402 is bent. The inclination direction of the said incline shall be so designed that when reset pole 14 resets and moves downwards, the electromagnetic tripping iron core 151 could step backwards. Reset locking hole 401 is provided above incline 402.

The electromagnetic tripping iron core 151, with the step axial shape, is covered over by the iron core reset spring 153 and then is inserted slideably from the end close to reset pole 14 into the central axial hole of the tripping coil rack 154. The front end of electromagnetic tripping iron core 151 is exposed, and is of spherical shape. The motion trail of the said reset locking hole 401 along with the pressed reset key 4 intersects with the centerline of the said electromagnetic tripping iron core 151. The reset locking hole 401 clearance-fits with the end of the electromagnetic tripping iron core 151, forming the reset latching mechanism.

Figure 18:
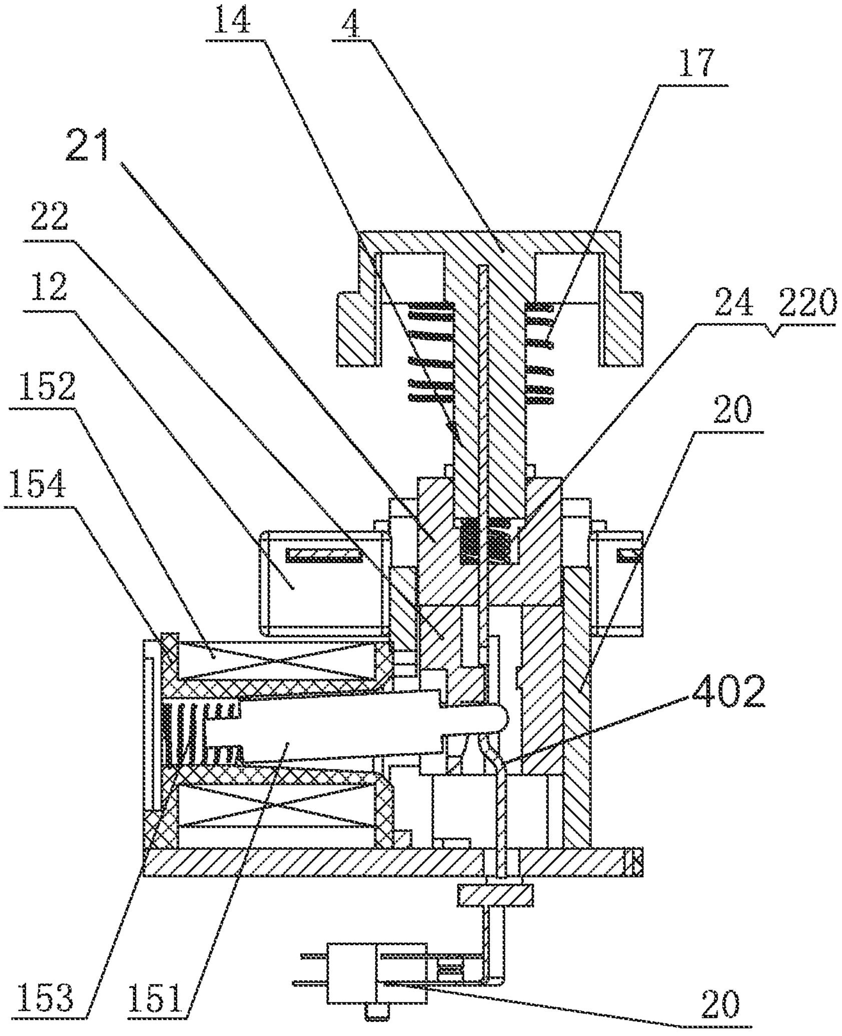
FIG. 18 is a view along cross-section B-B of FIG. 16.
Figure 19:
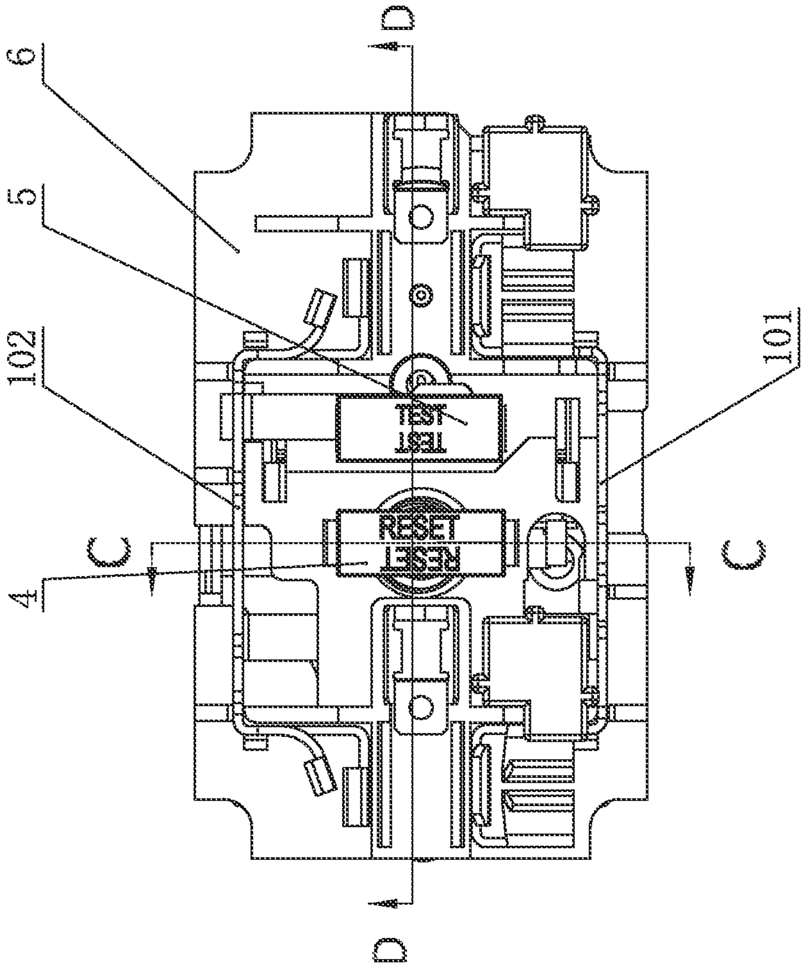
FIG. 19 is a top view of another embodiment with the upper cover and base removed.
Figure 20:
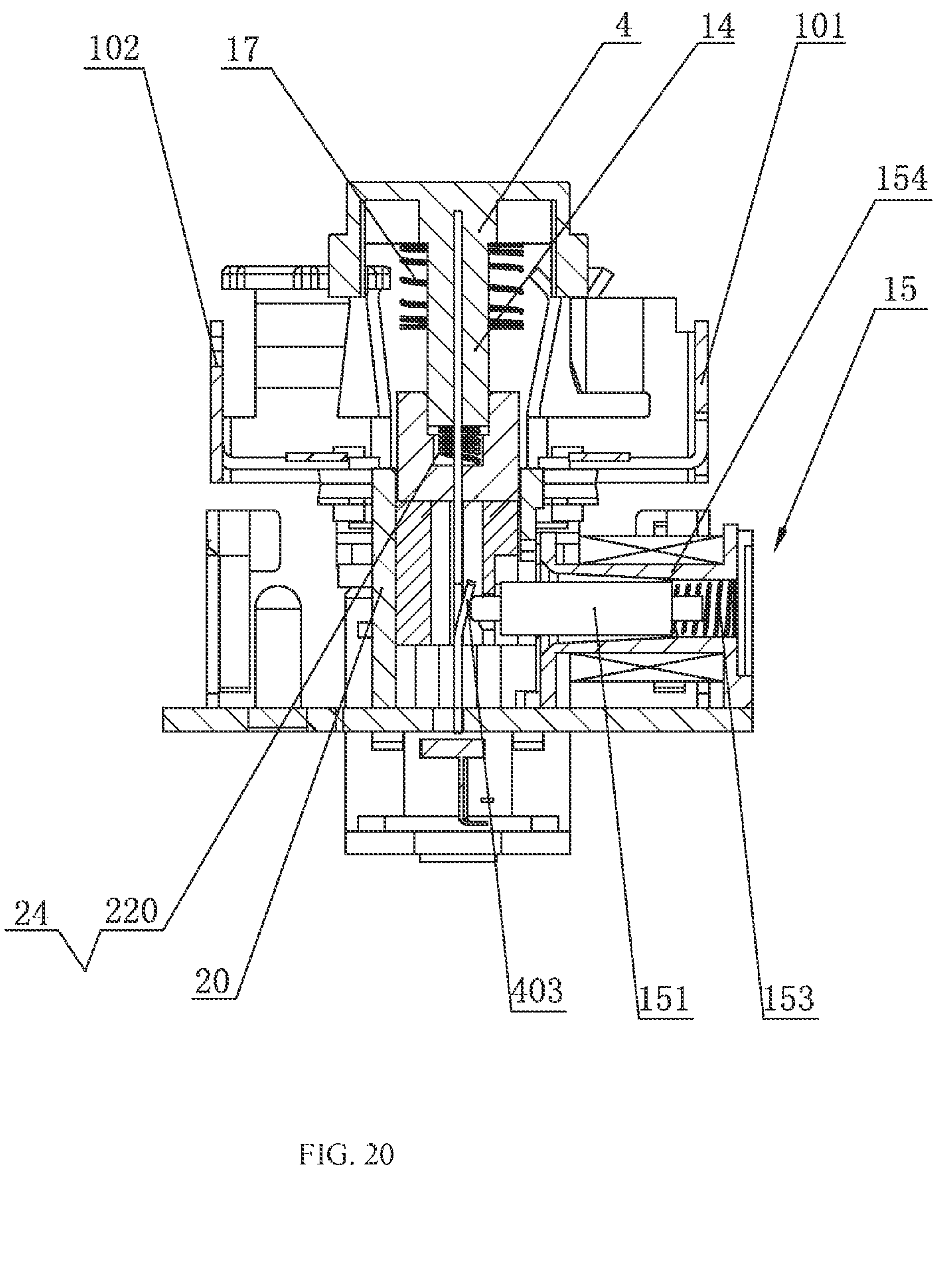
FIG. 20 is a view along cross-section C-C of FIG. 19.

At the positions on the outer wall of the said reset sliding block 22 and the said reset locking hole 401 corresponding to the pressing motion trail of the reset key 4, linking holes 143 that penetrate to the internal hole are provided. The said linking hole 143 is sized to clearance-fit with the electromagnetic tripping iron core 151. The reciprocating end of the said electromagnetic tripping iron core 151 is located in the linking hole 143, constituting the said reset linkage clutching mechanism. In tripped state, the central axis of the said electromagnetic tripping iron core 151 corresponds to incline 402 at the lower part of reset pole 14 or below it. Under the action of the elastic force of iron core reset spring 153, the front end of the said electromagnetic tripping iron core 151 pushes against incline 402 at the lower part of reset pole 14 or below it. However, the distance from reset locking hole 401 to the centerline of electromagnetic tripping iron core 151 shall be no more than the stroke of reset key 4. Locating the reciprocating end of the said electromagnetic tripping iron core 151 in linking hole 143 is to satisfy the homing stroke of reset key 4 and to drive the said reset bracket 12 for resetting through the interaction between the said reset incline 121 and the incline of the said projecting incline. For this reason, in this embodiment as shown in FIGS. 18 & 20, the central axial hole of tripping coil rack 154 is designed as a cone. The end facing reset locking hole 401 is with larger diameter. The central axial hole can also be designed as a fan-shaped cavity. It is preferable that tripping coil rack 154 should be covered with a tripping coil shielding case to minimize the leakage of electromagnetic wave.

Figure 21:
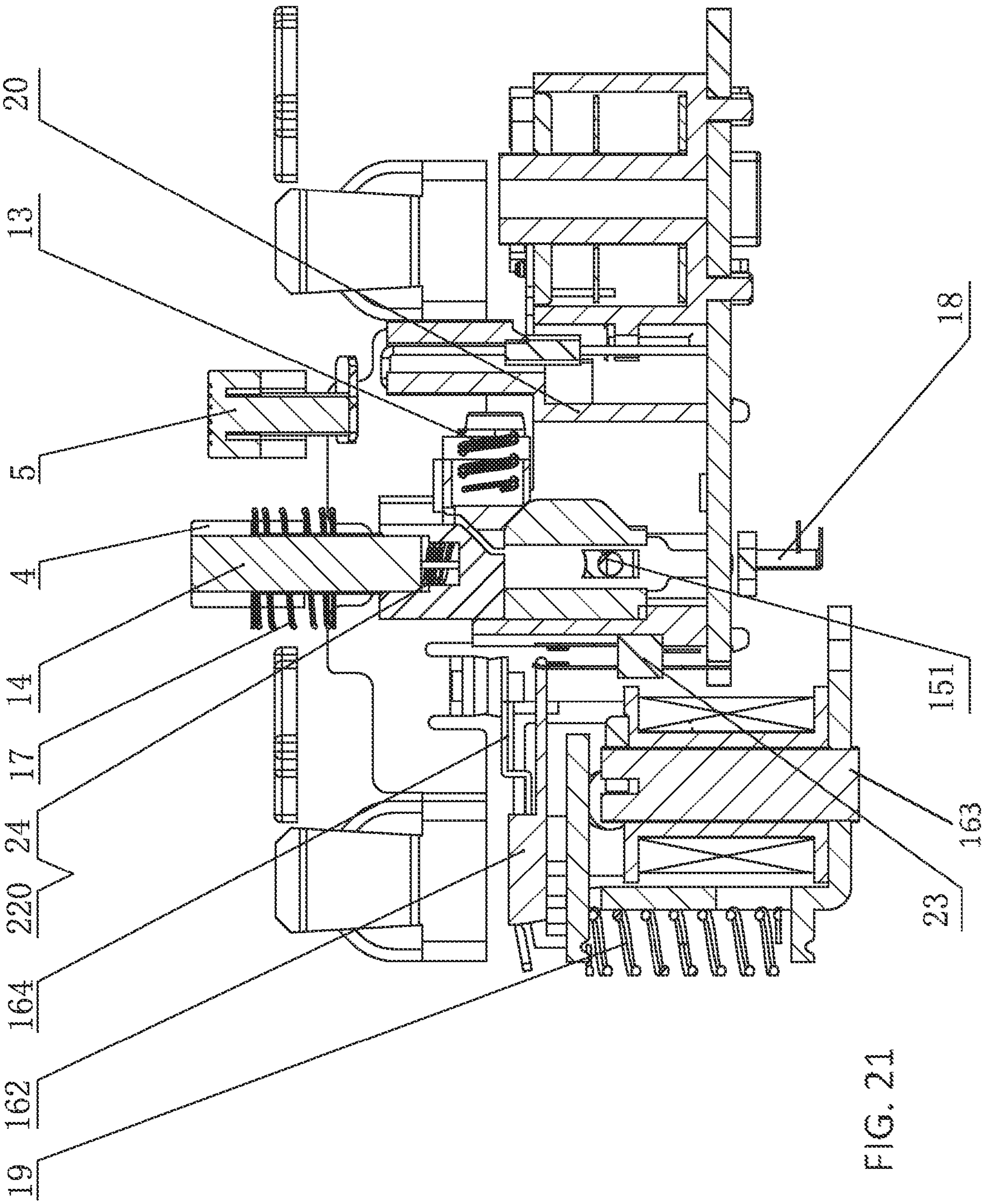
FIG. 21 is a view along cross-section D-D of FIG. 19.

The reverse wiring protection device 99 includes electromagnetic generating device 161, electromagnetic actuator bracket 162, actuator bracket homing mechanism and holding switch 23. The said electromagnetic actuator bracket 162 is provided with a pair of conductive pads 164 & 165. At one end of the said conductive pads 164 & 165, movable contacts 166 & 167 are provided corresponding to the receptacle output stationary contacts 105 & 106 (i.e. K3 in FIG. 25). The said actuator bracket homing mechanism keeps the said conductive pad movable contacts 166 & 167 and the receptacle output stationary contacts 105 & 106 in normally-closed state. The said electromagnetic generating device 161 controls the said electromagnetic actuator bracket 162 to act, disconnecting the said conductive pad movable contacts 166 & 167 from the receptacle output stationary contact 105 & 106. As shown in FIG. 21, in this embodiment, the said electromagnetic generating device 161 is composed of electromagnetic coil with iron core 163 provided in the center. The said electromagnetic generating device 161 is provided in the end close to wiring output assembly 9. Two ends of the power supply sub-circuit of the said electromagnetic generating device 161, i.e. normally closed reed switches 18 connected in series, bridge over the wiring output assembly 9. The said reed switch links with reset key 4. When it is reset after normal tripping, reset key 4 causes the reed switch to open. The power sub-circuit of electromagnetic generating device 161 is powered off, keeping the said conductive pad movable contacts 166 & 167 and receptacle output stationary contacts 105 & 106 in normally-closed state.

The said electromagnetic actuator bracket 162 is composed of insulation plates. A pair of conductive pads 164 & 165 are sandwiched in the insulation plates. Conductive pads 164 & 165 can be made as Z shape to facilitate improvement of elasticity and to improve contact reliability. Pivot is provided in the middle section of the insulation plate, forming a seesaw structure provided above the said electromagnetic generating device 161 and below middle frame 6. The insulation plate is also provided with armature, which is adjacent to the iron core. One end of the said pair of conductive pads 164 & 165 extends to below the left and right stationary pieces 103 & 104 on the left and right receptacle pads 101 & 102 respectively. The end movable contacts 166 & 167 of the conductive pads 164 & 165 correspond to the receptacle output stationary contacts 105 & 106. In this embodiment, between the other side of the pivot on the said electromagnetic actuator bracket 162 and one end of the mounting bracket of the electromagnetic generating device 161, tension spring 19 is provided to constitute the said actuator bracket homing mechanism, causing the said conductive pad movable contacts 166 & 167 to warp upwards and to contact with the receptacle output stationary contacts 105 & 106 thereby keeping in normally-closed state.

Between the other end of the said pair of conductive pads 164 & 165 and the wiring output assembly 9, the second short-circuit conductor 21 is provided to constitute electrical connection. So under the normal conditions, the conductive assembly from the power input side to the load side is composed of two groups of conductors. One group is power input connection assembly 7, and the other group includes short-circuit conductive strip 8, receptacle output assembly 10, conductive pad, short-circuit conductor and wiring output assembly 9. For the first short-circuit conductor 11 and the second short-circuit conductor 21, normally flexible conductors braided with fine copper wires are selected. In this embodiment, the reed switch 18 is provided at the bottom of base 1, and is composed of a pair of conductive reeds with contacts provided at the ends. The two conductive reeds are provided with one above another. The end of the lower conductive reed is just at the lower end of reset pole 14. Through hole is provided on the bottom of base 1 at the position corresponding to the lower end of reset pole 14. The lower end of reset pole 14, through the said through hole, is adjacent to the end of the conductive reed below, constituting the linkage with reset key 4. The holding switch 23 is connected in parallel with the reed switch 18. The holding switch 23 is a normally-open switch, and links with the electromagnetic actuator bracket.

The working status of holding switch 23 is reverse to that of the conductive pad movable contact and receptacle output stationary contact. That is to say, if the conductive pad movable contact and receptacle output stationary contact are closed, the holding switch 23 is open; if the conductive pad movable contact and receptacle output stationary contact are open, the holding switch 23 is closed.

Figure 6:
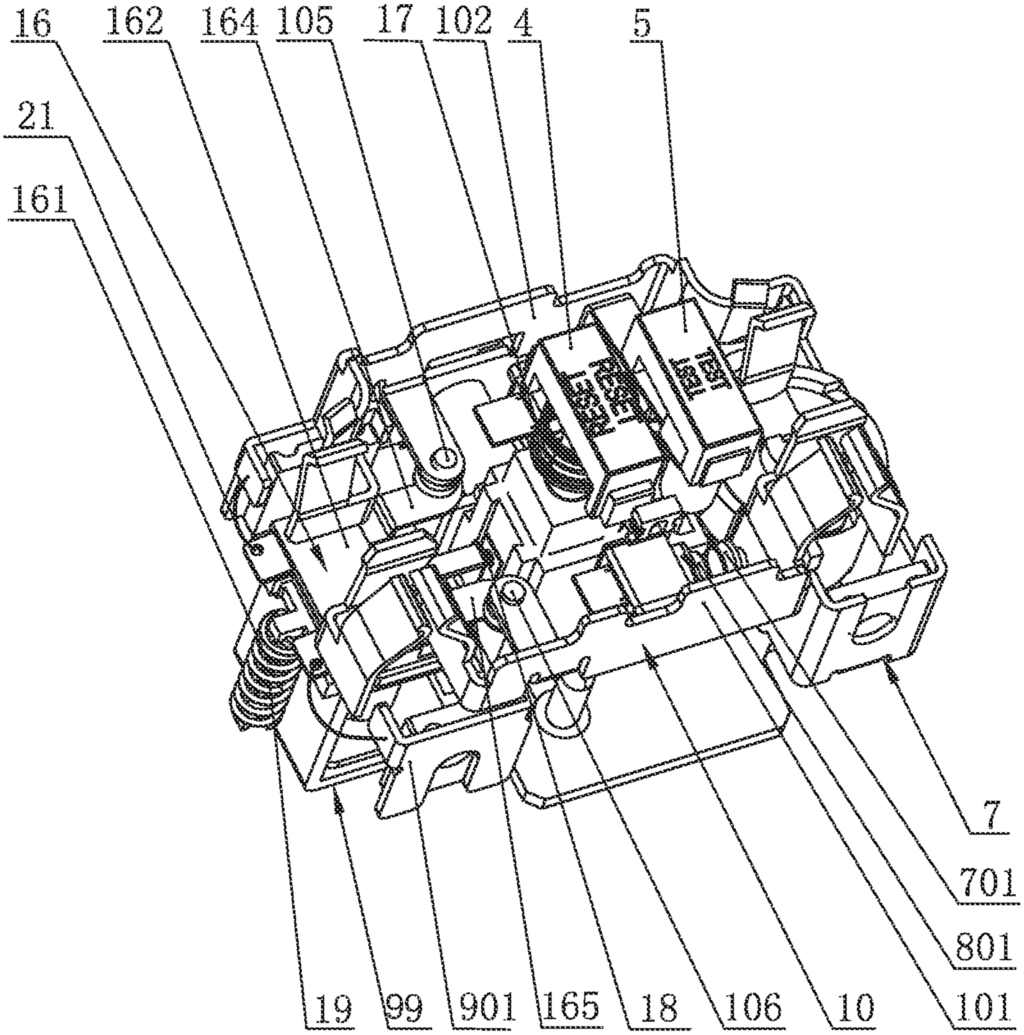
FIG. 6 is an internal structural top-view diagram of an embodiment with the upper cover, base and ground iron removed.
Figure 25:
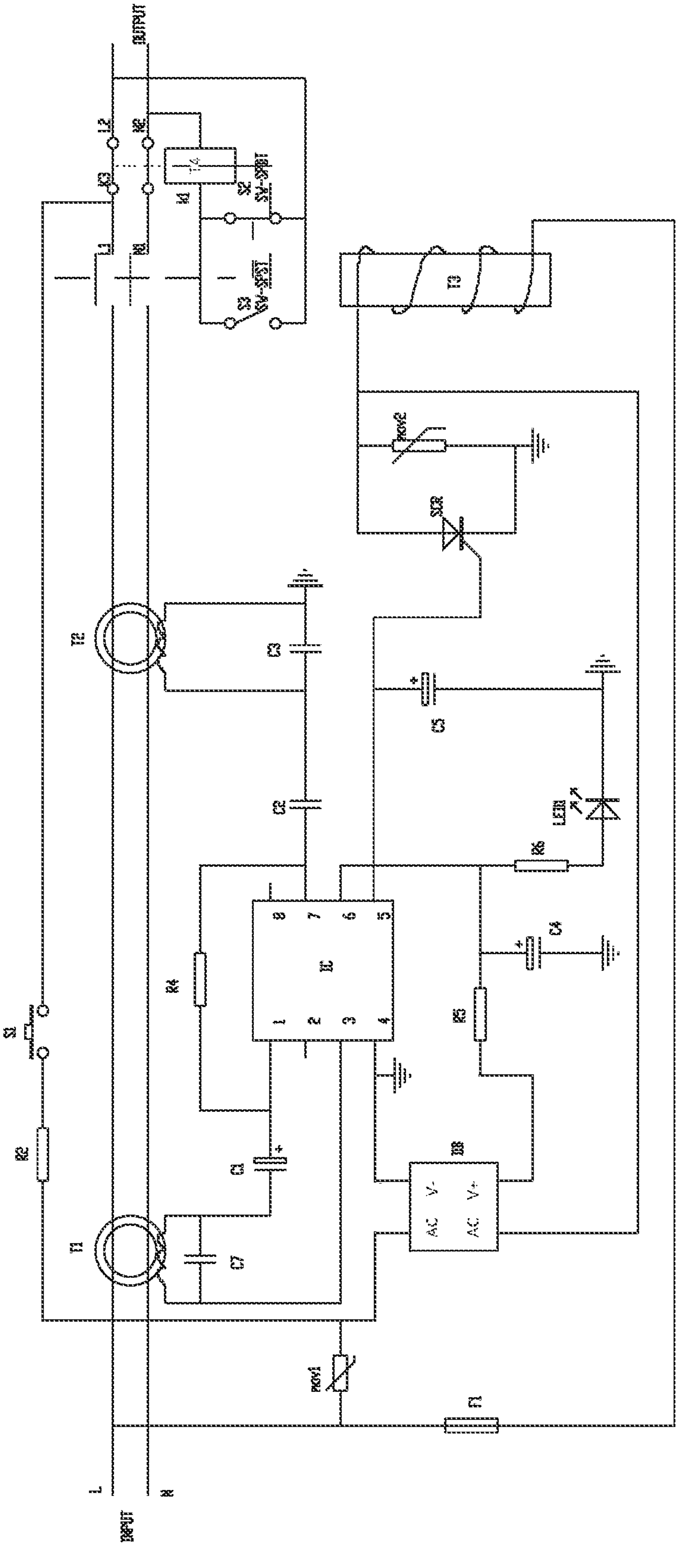
FIG. 25 is a circuit schematic of an embodiment.

As shown in FIGS. 6 & 7, in this embodiment, the same structure as reed switch 18 is adopted for the holding switch 23 (S3 in FIG. 25). That is to say, it is also composed of a pair of conductive reeds with contacts provided in the ends. The contacts at the ends of the two conductive reeds are provided in opposed and adjacent positions, and are set in normally-open form. The holding switch 23 is fixed on the side wall of reset bracket seat 20 in front of electromagnetic actuator bracket 162, and is located in the swinging trail of electromagnetic actuator bracket 162. Under the action of the electromagnetic force of electromagnetic generating device 161, electromagnetic actuator bracket 162 actuates. This causes, in the same time as the conductive pad movable contacts 166 & 167 and receptacle output stationary contacts 105 & 106 open, the reed of holding switch 23 in the side contacted by electromagnetic actuator bracket 162 to close up to the reed of the other side, causing holding switch 23 to be closed. This causes the power sub-circuit of the electromagnetic generating device 161 to be also connected even when reed switch 18 is open.

As shown in FIGS. 3-6, the receptacle output assembly 10 is composed of two (left and right) pieces of conductive receptacle pads 101 & 102. Insertion grooves are provided in the two sides of middle frame 6 respectively. The left and right receptacle pads 101 & 102 are inserted in the insertion grooves respectively so that they are in the two sides of reset bracket 12 within the slots 120 provided. The two ends of the left and right receptacle pads 101 & 102 are provided with formed clips matching with the plugs respectively. The positions of the clips are suitable for the two groups of receptacle sockets 3 on upper cover 2.

The receptacle output assembly 10 is also provided with receptacle output stationary contacts 105 & 106. In this embodiment, the left and right receptacle pads 101 & 102 are provided respectively with left and right stationary pieces 103 & 104 extending to the center of base 1. Receptacle output stationary contacts 105 & 106 are provided on left and right stationary pieces 103 & 104. Wiring output assembly 9 is composed of two pieces of conductive wiring pieces 901 & 902 and screws 903 & 904. The two conductive wiring pieces 901 & 902 are inserted in the inner wall in the two sides of base 1. On the two side walls of base 1 at the positions corresponding to conductive wiring pieces 901 & 902, notch is provided, exposing conductive wiring pieces 901 & 902. The structure of power input connection assembly 7 is similar to that of wiring output assembly 9. It is also inserted in the inner wall in the two sides of base 1 at the other end. One end of power input connection assembly 7, through the mutual-inductive magnet ring, extends (or otherwise formed by connecting two sections of conductors) to near the lower end of short-circuit conductive strips 8. It is provided with power input conductive stationary contacts 701 & 702 to correspond to conductive movable contacts 801. Such structure of short-circuit conductive strips 8 makes the reset mechanism in reset state. Short-circuit conductive strips 8, in the rear side of conductive movable contacts 801, can be provided with elastic support such as springs. Therefore, even when the power input conductive stationary contacts 701 & 702 are not in a same plane accurately, short-circuit conductive strips 8 can adapt automatically to ensure reliable contact.

Figure 12:
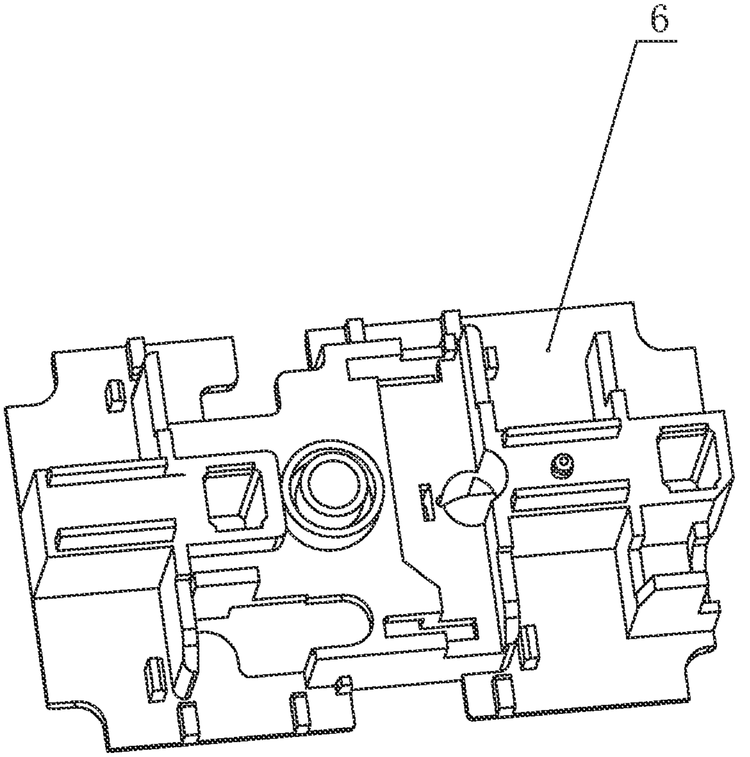
FIG. 12 is a structural top view of an embodiment of the middle frame.
Figure 13:
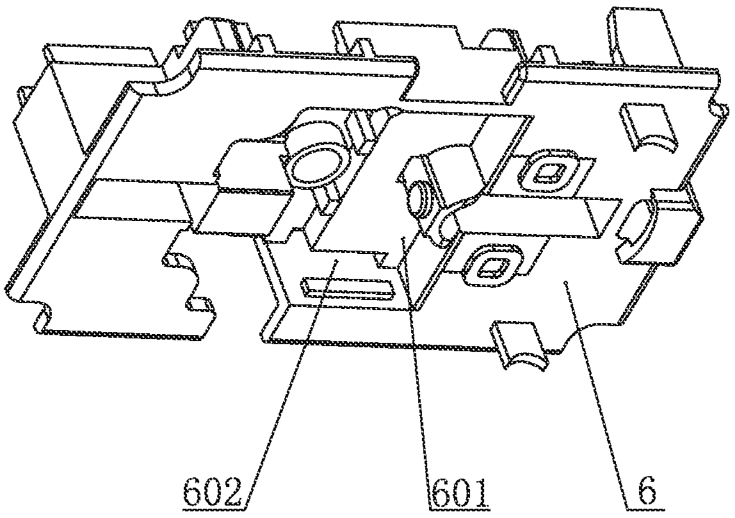
FIG. 13 is a structural bottom view of the embodiment of the middle frame.
Figure 14:
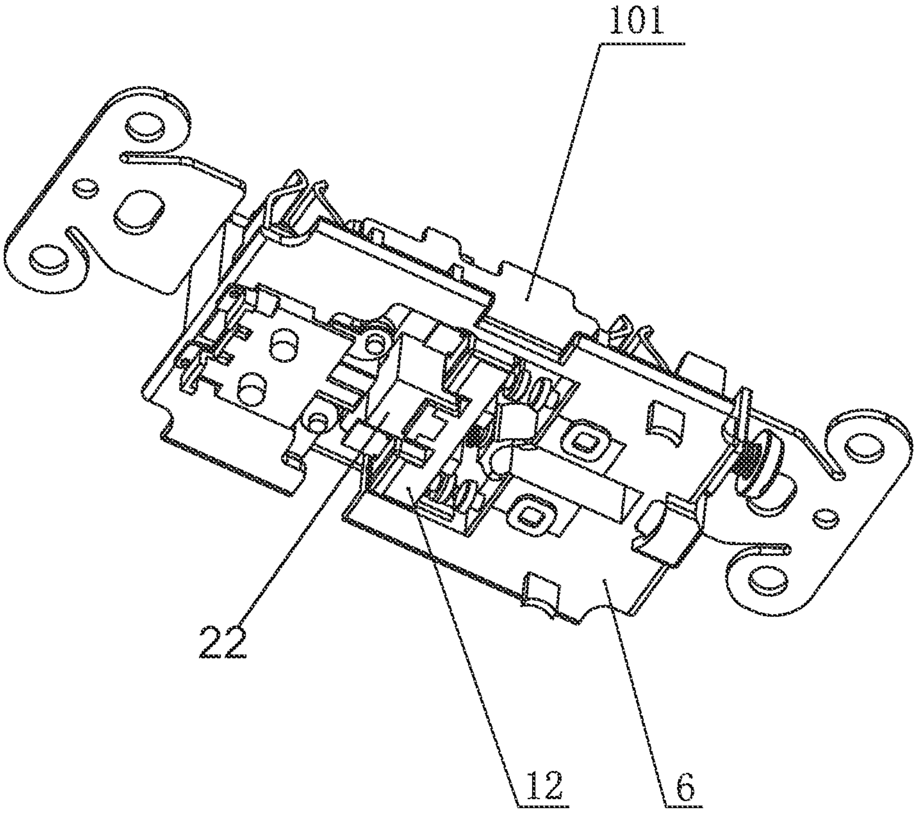
FIG. 14 is a diagram of the reset bracket installed in the middle frame.
Figure 15:
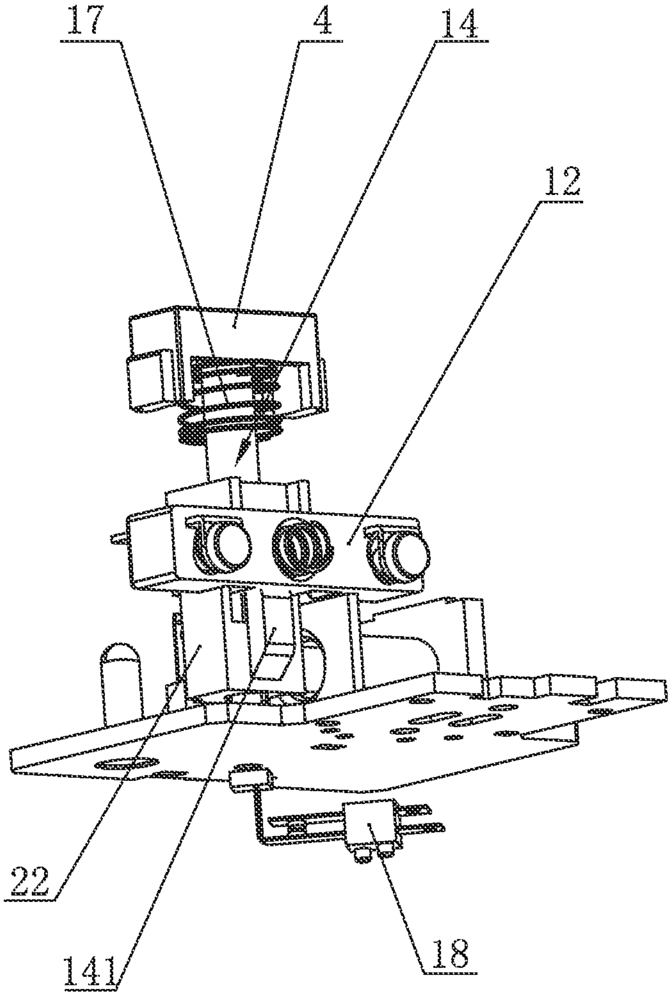
FIG. 15 is a structural diagram of the reset mechanism and electromagnetic tripping mechanism of an embodiment with the reset bracket seat removed.
Figure 16:
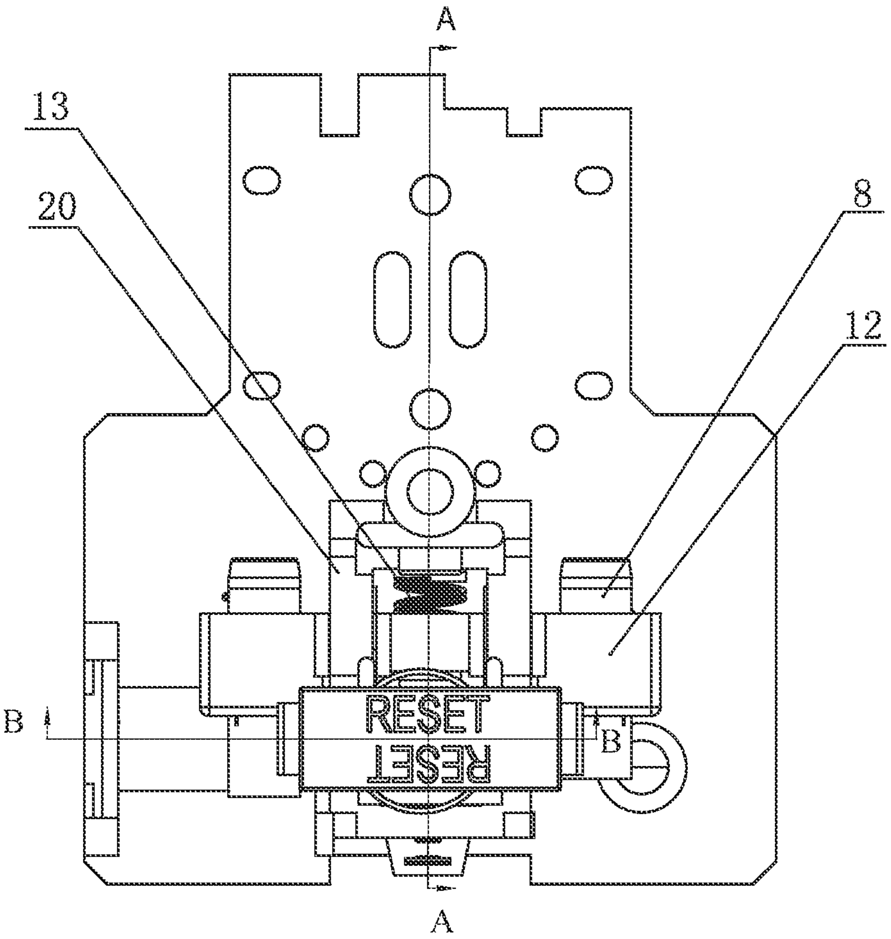
FIG. 16 is a top view of the reset mechanism and electromagnetic tripping mechanism of the embodiment.
Figure 17:
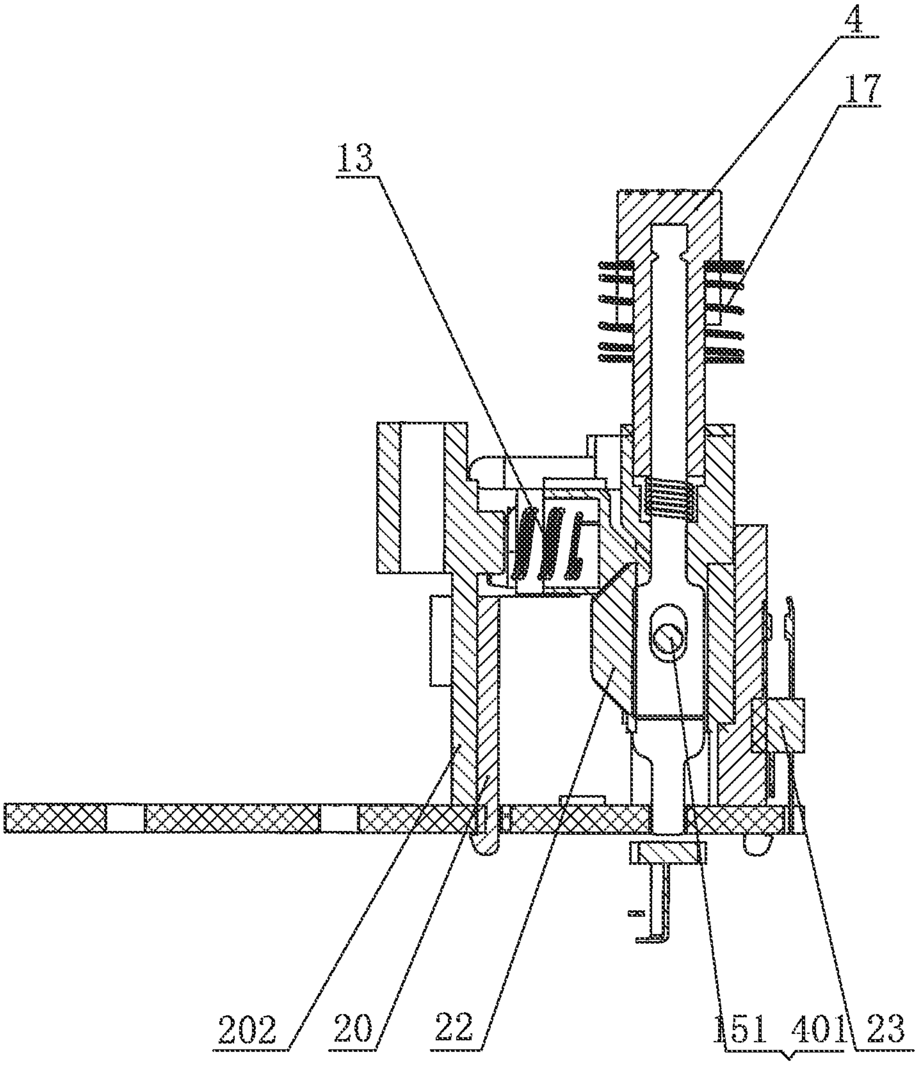
FIG. 17 is a view along cross-section A-A of FIG. 16.

To facilitate assembly, the said reset bracket seat 20 can also be provided with horizontal sliding face only and with no ninety degree "]"-shaped guide clips 201, while the other structure can be the same as that of the previously described embodiment. As shown in FIG. 24, the said reset bracket 12 can be provided slideably on the sliding face on the top of reset bracket seat 20, and can be located below the middle frame 6. As shown in FIG. 12-14, a concave cavity that matches with reset bracket 12 can be provided on the lower surface of middle frame 6, forming bracket sliding cavity 601. The top of reset bracket 12 can be located in the said bracket sliding cavity 601. Horizontal convex ribs can be provided in the two ends on top of reset bracket 12. On the two side walls of the bracket sliding cavity corresponding to the horizontal convex ribs 123, matching horizontal concave slots 602 can be provided. The horizontal convex ribs 123 clearance-fit with the horizontal concave slots 602 to constitute a guide mechanism.

In addition, in the reset latching mechanism, the reset locking hole 401 on reset key 4 is not the only structure to mate with electromagnetic tripping iron core 151. Alternatively, projecting reset hook 403 can be provided at the corresponding position on reset pole 14. Reset hook 403 can be made by punching, as shown in FIGS. 20 and 22 and reset hook 403 can be used to hook tripping iron core 151.

The working principle of this receptacle type ground fault circuit interrupter is as follows: The circuit schematic diagram of this receptacle type ground fault circuit interrupter is shown in FIG. 25. When the receptacle type ground fault circuit interrupter is in its initial state, the reset key 4 is in its original state under the action of the elastic force of the key reset spring 17. At this time, under the action of the reset mechanism of reset sliding block 22 (i.e. compression spring 24), reset sliding block 22 slides downwards off reset bracket 12, causing that the projecting incline 142 on reset sliding block 22 fails to interact with reset incline 121. Under the action of the elastic force of iron core reset spring 153, the front end of electromagnetic tripping iron core 151 penetrates linking hole 143 of reset sliding block 22 and pushes below reset locking hole 401. Under the action of the elastic force of support spring 13, reset bracket 12 slides toward Position 2 and the contact is in a tripped state (i.e. open state).

When reset key 4 is pressed manually and resets, the pressure overcomes the elastic force of key reset spring 17, causing reset key 4 to move downwards. In the meantime, the front end of electromagnetic tripping iron core 151, under the action of the incline 402, causes electromagnetic tripping iron core 151 to retreat and to slide into reset locking hole 401.

After the external force is withdrawn, under the action of the elastic force of key reset spring 17, reset key 4 together with reset pole 14 moves upward. Because the front end of electromagnetic tripping iron core 151 in inserted through linking hole 143 of reset sliding block 22 into reset locking hole 401, reset sliding block 22 links with reset pole 14 and moves upward. In this up-moving process, projecting incline 142 on reset sliding block 22 interacts with reset incline 121 and overcomes the elastic force of support spring 13, pushing reset bracket 12 to slide toward Position 1. This causes the power input conductive stationary contacts 701 & 702 to contact with conductive movable contacts 801 (K1 in FIG. 25) of short-circuit conductive strips 8 and be in reset state (i.e. closed state).

Also during the manual pressing of the reset key 4, reed switch 18 (S2 in FIG. 25) opens as pushed by the end of reset pole 14. When leakage current is detected, the leakage signal detection circuit makes the electromagnetic tripping mechanism 15 act, i.e. the electromagnetic tripping iron core 151 retracts under the action of the electromagnetic force. The end of the electromagnetic tripping iron core 151 separates from the reset locking hole 401. The reset pole 14 along with the reset key 4 moves upwards under the action of the elastic force of the key reset spring 17. Under the action of the reset mechanism (i.e. compression spring 24) of reset sliding block 22, reset sliding block 22 slides off reset bracket 12 and is in the original state. Meanwhile, the reset bracket 12 slides to Position 2 under the action of the elastic force of the support spring 13. The contact is in trip state (i.e. open state). The power supply for the receptacle output assembly 10 and wiring output assembly 9 is disconnected, achieving the leakage protection purpose.

In case of reverse connection of the circuit in trip state, because the contact of reed switch 18 (i.e. S2 in FIG. 25) is closed at the time, the power sub-circuit of electromagnetic generating device 161 (T4 in FIG. 25) connected on wiring output assembly 9 obtains power supply and controls the electromagnetic actuator bracket 162 to act, making the conductive pads 164 & 165 movable contacts (K2 in FIG. 25) disconnect from the receptacle output stationary contacts 105 & 106. The power interruption in the receptacle output assembly causes there to be no power output in the receptacle jacks. So the receptacle can realize the reminding and reverse wiring protection functions and eliminate the hidden safety trouble.

The reed of holding switch 23 (S3 in FIG. 25) in the side contacted by electromagnetic actuator bracket 162 closes up to the reed of the other side, causing holding switch 23 (S3 in FIG. 25) to be closed. When reset key 4 is pressed continuously with external force, also because holding switch 23 (S3 in FIG. 25) is still closed, the power sub-circuit of electromagnetic generating device 161 (T4 in FIG. 25) connected on wiring output assembly 9 can still obtain power supply and control the electromagnetic actuator bracket 162 to act, making the conductive pads 164 & 165 movable contacts (K2 in FIG. 25) disconnect from the receptacle output stationary contacts 105 & 106. There is yet no power output in the receptacle jacks. So the receptacle can realize the reminding and reverse wiring protection functions.

Because the conductive assembly of the receptacle type ground fault circuit interrupter includes power input connection assembly, first short-circuit conductive strip, wiring output assembly, receptacle output assembly, second short-circuit conductive strip, a pair of conductive pads on the electromagnetic actuator bracket which are provided in pairs, and because the first short-circuit conductor and the second short-circuit conductor are provided between the wiring output assembly and receptacle output assembly to form electrical connection, the conductive assembly in normal time is composed of two groups of conductors, which realize electrical connection through the contact between the movable contacts on the short-circuit conductive strips and the stationary contacts on the receptacle output assembly, and the short-circuit conductive strips form elastic support with a spring.

During reset, due to the action of the elastic support component, the movable contact presses elastically on the stationary contact, ensuring contact pressure. So the contact resistance is lessened. Moreover, because the short-circuit conductive strips are supported elastically, even when the position of the stationary contacts are slightly deviated, the short-circuit conductive strips are self-adjustable and self-adaptable, thus improving the working reliability.

Through the above setting, when under normal (correct) wiring conditions and while in the trip state, no power supply is available on the wiring output assembly and the movable contacts on the conductive pads and the receptacle output stationary contact close. In the reset state, since the contact of the reed switch opens, no power supply is available on the power supply sub-circuit of the electromagnetic generating device, and the movable contact on the said conductive pad and the receptacle output stationary contact are also closed. Therefore, the conductive assembly is still composed of two groups of conductors.

In the case of reverse connection in the circuits, in a trip state, since the contacts of the reed switch close, the power supply sub-circuit of the electromagnetic generating device connected on the wiring output assembly obtains power supply and controls the electromagnetic actuator bracket to act, disconnecting the conductive pad movable contacts and the receptacle output stationary contacts, turning off the power in the receptacle output assembly, and allowing no power output in the receptacle sockets.

Meanwhile, since a reset linkage mechanism is provided between the reset key and the reset bracket to link the reset key homing action and the sliding of the reset bracket to Position 1 and also reset linkage clutching mechanism is provided, the reset linkage clutching mechanism controls the said reset linkage mechanism to link when the interrupter resets and the reset bracket slides to Position 1. The sliding reset is to be driven through the reset key homing action. It cannot be reset when the reset key is pressed continuously with external force. That is to say, the movable contacts of the conductive pads will not close with the receptacle output stationary contacts when there is a reverse wire. Therefore, in case of reverse wiring of the circuit, whether in tripped state or in the state where the reset key is continuously pressed, the conductive assembly from the power input side to the load side is always separated into two segments and no power is outputted from the receptacle sockets. So the reminding and safety protection functions are realized and the hidden trouble in safety is eliminated.

Figure 26:
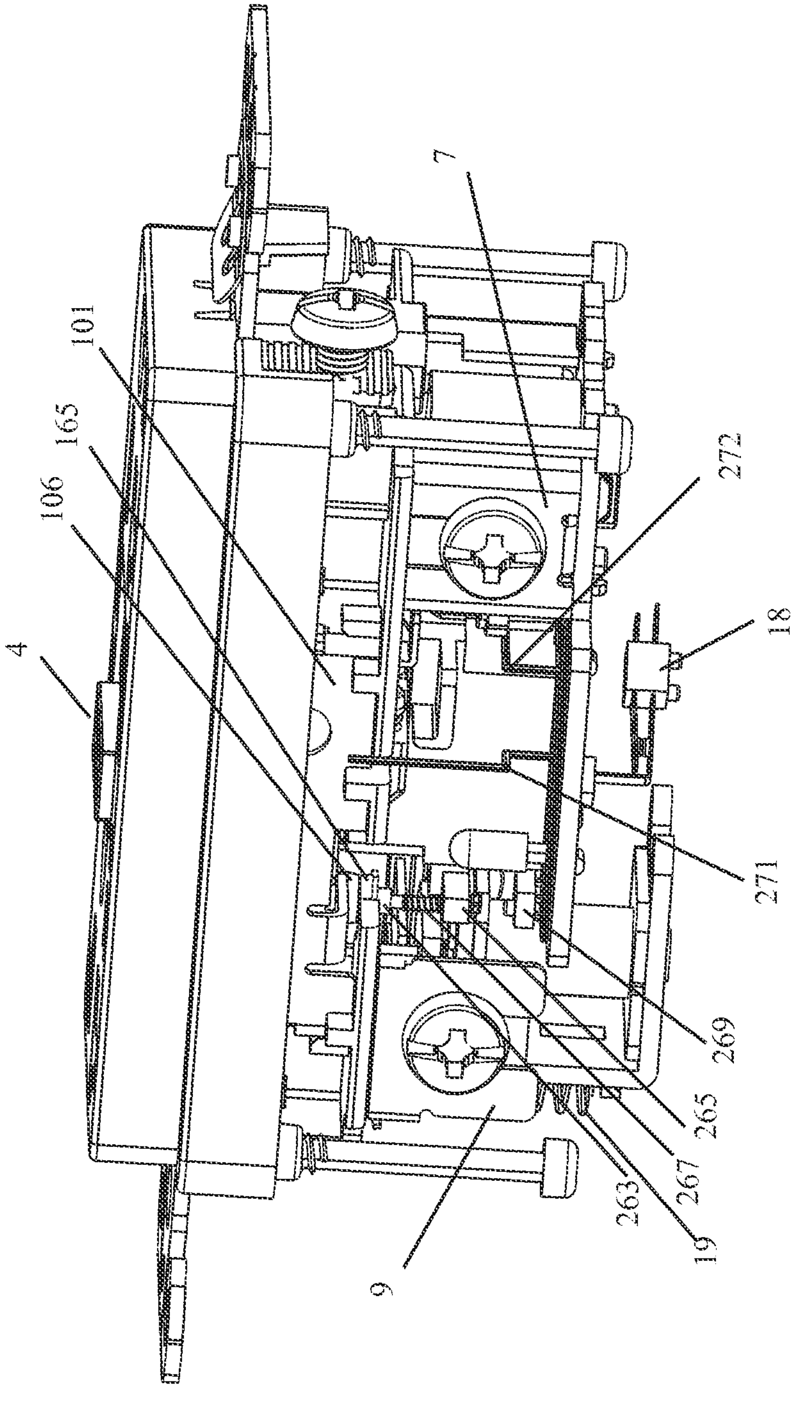
FIG. 26 is a view of an additional embodiment in a tripped state with correct wiring.
Figure 27:
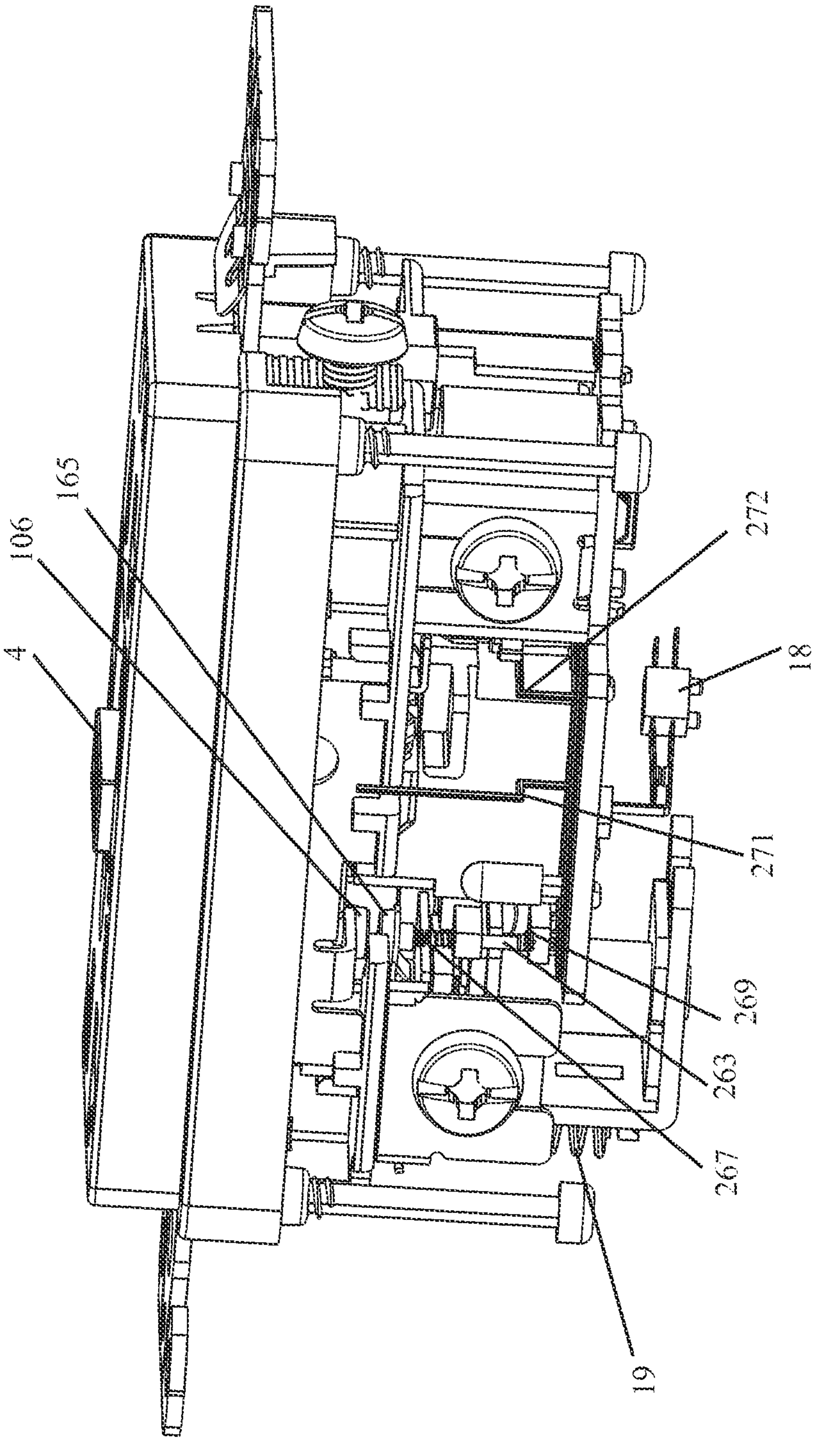
FIG. 27 is a view of the additional embodiment in a tripped state with reverse wiring.

FIGS. 26 and 27 show an additional embodiment with an additional switch 269 (K4). Switch 269 (K4) may be a two-pole switch connected to a switch K6 such that when K6 closes, K4 opens, and when K6 opens, K4 closes. K6 is formed by conductive pads 164 & 165 attached to movable contacts 166 and 167 so that when the electromagnetic actuator bracket 162 is controlled by actuator bracket homing mechanism 19, the conductive pads 165 & 164 are respectively in contact with output stationary contacts 106 & 105. That is, when the receptacle is correctly wired, the contacts, corresponding to switch K6, are closed. However, the reset key 4 is raised and the reed switch 18, corresponding to switch S2, is closed, indicating a tripped or disconnected state.

A mandrel 263 is supported in an upward position by support spring 267 pressing against support 265. A switch 269, corresponding to switch K4, is in an open state. A corresponding mandrel, support spring, support, and switch are positioned under output stationary contact 105 and conductive pad 164. Neutral conducting pieces 271, connecting to neutral face (N1) and line (N) terminals, extend from neutral receptacle pad 101 to a neutral power input connection with a break formed at switch 269. Line (hot) conducting pieces 272, connecting hot face (L1) and line (L) terminals, extend from a hot receptacle pad 102 to a hot power input connection with a break formed at switch 269.

In the properly wired condition, the output stationary contacts 106 & 105 are electrically connected to movable conductive pads 164 & 165 (K6 is closed). The mandrel 263 is pushed up by the support spring 267 and the bottom of the mandrel 263 cannot press switch 269 and K4 is open. Contacts on switch 269 do not electrically connect the neutral face (N1) terminal to the neutral line (N) terminal, nor do contacts on the switch 269 electrically connect the hot face (L1) terminal to the hot line (L) terminal.

The switch 269 may have strips extending in a connective pattern to form the desired electrical connections when the switch 269 is pressed against the conducting pieces, or the switch 269 may have downwardly extending U shaped pieces embedded therein for selective connection to the conducting pieces. The switch may ride on a guide to ensure its alignment.

In the configuration of FIG. 26, the hot and neutral conducting pieces 272 & 271 do not conduct electricity. If the reed switch 18 opens, and the device is in a reset state, when the GFCI is properly wired, because output stationary contacts 105 & 106 connect to conductive pads 164 & 165 (switch K6 is closed), switch 269 (K4) is open.

In a reverse-wired condition, the reed switch 23 closes, as above, causing switch K6 to open. That is, movable conductive pads 165 & 164 separate from stationary contacts 106 & 105 when the reed switch 23 closes due to a reverse-wire condition. The downward motion of the conductive pad 165 pushes mandrel 263 downward, overcoming the support spring 267 force. The mandrel 263 presses against switch 269 causing it to close. As a result, the neutral face terminal (N1) and neutral line terminal (N) are electrically connected via neutral conducting pieces 271. Likewise, hot face terminal (L1) and hot line terminal (L) are electrically connected via hot conducting pieces 272.

In the tripped state, when reverse-wired, because K6 is open, K4 is closed. Therefore, the face terminals are connected to the line terminals. As a result, there are only two pairs of separate conductors: L-L1 and L2; and N-N1 and N2. In the tripped state, when correctly-wired, K5 & K6 are closed and K4 is open and the face terminals are connected to the load terminals while the line terminals are not connected to the face or load terminals. That is, there are two pairs of separate conductors: L1-L2 and L; and N1-N2 and N.

When in the reset state, when correctly-wired, K5 & K6 are closed and K4 is open. L is electrically connected to L1 and L2. N is electrically connected to N1 and N2.

Figure 28:
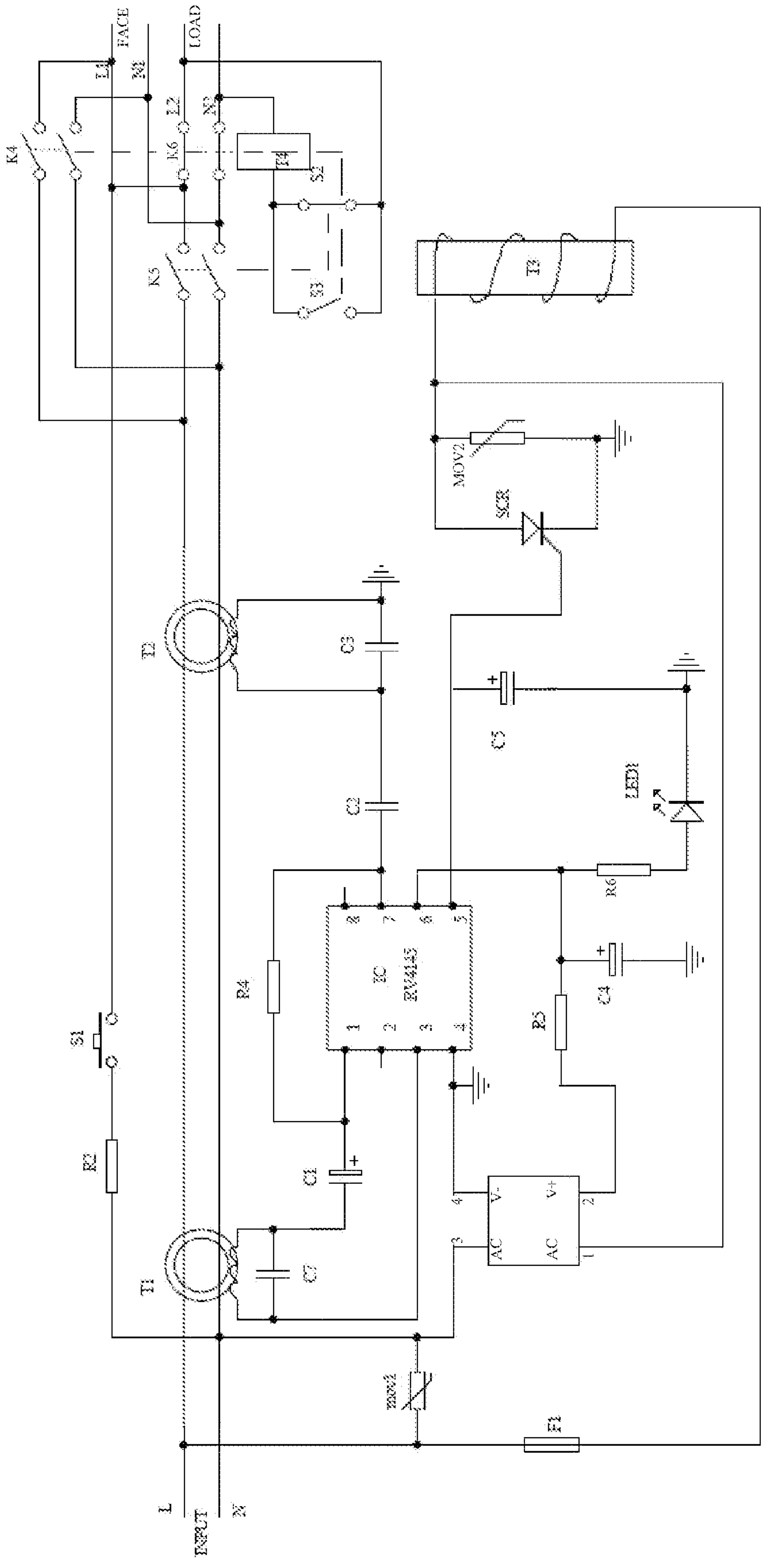
FIG. 28 is a circuit diagram of the additional embodiment in a shipped state.
Figure 29:
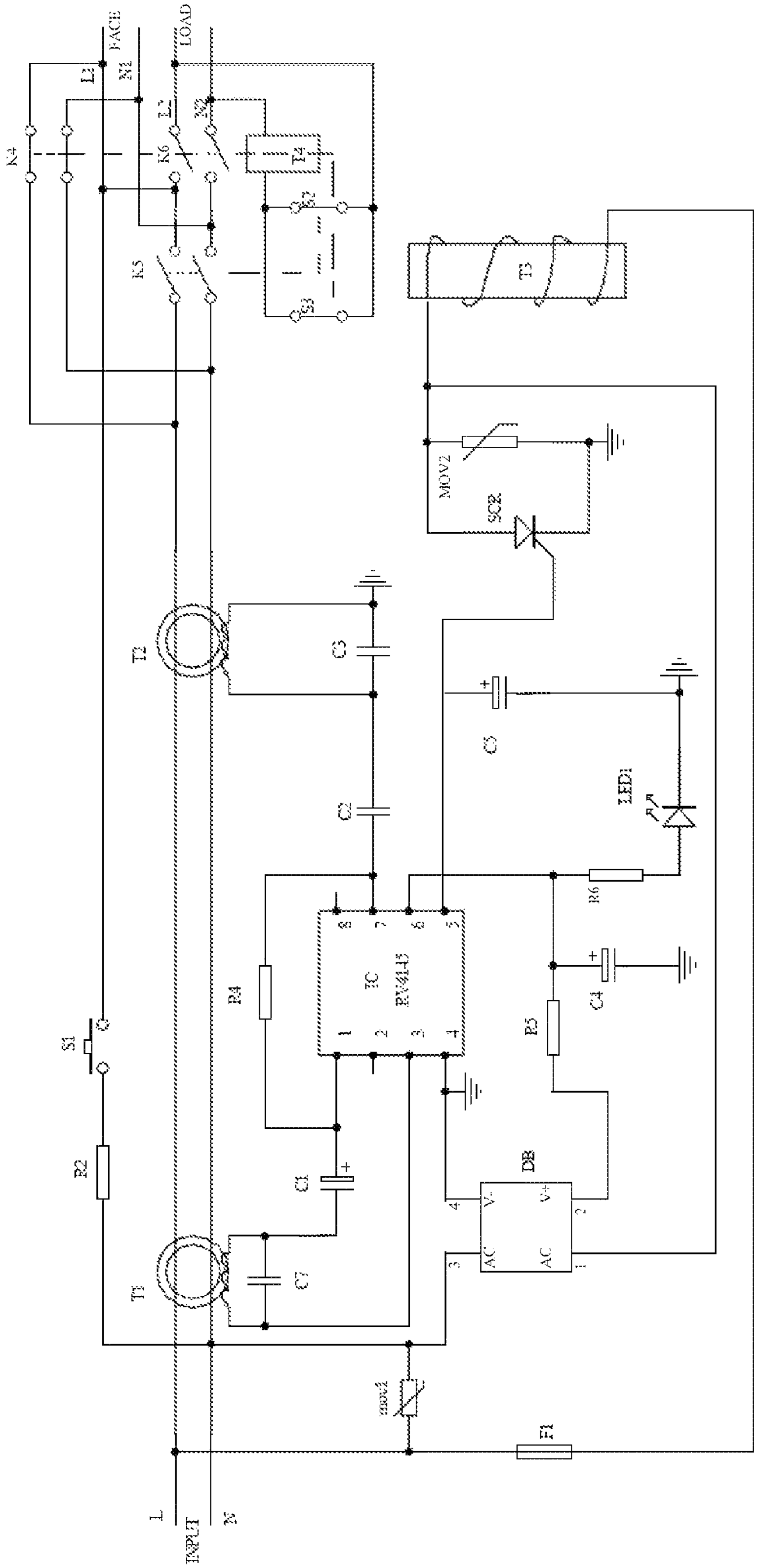
FIG. 29 is a circuit diagram of the additional embodiment of FIG. 28 in a reverse wire installation state.

FIGS. 28 & 29 illustrate a circuit having three sets of two-pole switches: K4, K5, & K6. A normally open two-pole switch K4 is between the input terminals L & N and the face terminals L1 & N1. Normally open two-pole switch K4 is linked with the reverse wire protection devices, including conductive pad movable contacts 164 and 165 (K6), electromagnetic generating device 161 (solenoid T4) and reed switch type holding switch 23 (S3).

Movable contacts 801 (switch K5) are linked with a reset button and reed switch 18 (S2). When the reset button is pressed to close switch K5, reed switch 18 (S2) interacts with the reset pole 14, as described above. If no leakage current is detected, tripping iron core 151 of solenoid T3 holds the reset pole 14 in place, as described above. However, when a leakage current causes a trip condition, solenoid T3 releases the tripping iron core 151 to open switch K5, as above. However, FIGS. 26 and 27 do not show the reset or tripped conditions, and instead show reverse wire conditions.

In FIG. 28, normally closed switch K6 is closed, causing conductive pads 164 & 165 to contact the output stationary contacts 105 & 106. If a reverse wire occurs, as shown in FIG. 29, solenoid T4 activates and holding switch 23 (S3) closes to hold normally closed switch K6 in an open state. Normally open switch K4 closes to connect face terminals L1 & N1 with line terminals L & N. In this reverse wire condition, there are two conductor pairs: the first conductor pair being the connected line L & N and face L1 & N1 terminals and the second conductor pair being the load terminals L2 & N2.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A ground fault circuit interrupter for a receptacle having a power input side and a load side, comprising:

- a reset key with a pressing direction, comprising a reset locking mechanism having a motion trail that intersects with a central longitudinal axis of an electromagnetic tripping iron core;
- a reset mechanism comprising:
  - a reset bracket comprising:
    - a first guide slot on a first side; and
    - a second guide slot on a second side;
  - a bracket reset mechanism comprising at least one support spring; and
  - a bracket homing mechanism that is biased to push the reset bracket in a sliding direction in to a first position;
- a reset linkage mechanism between the reset key and the reset bracket, the reset linkage mechanism configured to link a reset homing action and the sliding of the reset bracket;
- a reset linkage clutching mechanism configured to control the reset linkage mechanism when the interrupter resets;
- an electromagnetic tripping mechanism, comprising:
  - a coil rack with a central hole;
  - an electromagnetic tripping coil wound around the coil rack;
  - the electromagnetic tripping iron core; and
  - an iron core reset spring;
- a conductive assembly configured from the power input side to the load side, the conductive assembly configured to selectively connect or disconnect electrical continuity between the power input side and the load side, the conductive assembly comprising:

a pair of short-circuit conductive strips, each strip having a conductive movable contact;

a pair of power input connection assemblies, each comprising an input conductive stationary contact configured opposite to the conductive movable contacts of the short-circuit conductive strips;

a pair of wiring output assemblies;

a pair of receptacle output assemblies, each receptacle output assembly having an output stationary contact;

a first short-circuit conductor and a second short-circuit conductor between the pair of short-circuit conductive strips and the pair of wiring output assemblies; and a third short-circuit conductor and a fourth short-circuit conductor between the pair of power input connection assemblies and the pair of receptacle output assemblies; and a reverse wiring protection device comprising:

an electromagnetic generating device having a power supply sub-circuit configured with a reed switch connected in series;

an electromagnetic actuator bracket with a pair of conductive pads, each pad having a movable contact, configured to selectively electrically connect and disconnect to the pair of output stationary contacts;

an actuator bracket homing mechanism; and a normally open holding switch connected in parallel with the reed switch, and linked with the electromagnetic actuator bracket, wherein:

the electromagnetic tripping iron core and the iron core reset spring are positioned in the central hole of the coil rack with a clearance fit, the electromagnetic tripping iron core is configured to slide perpendicular to the pressing direction of the reset key, the reset locking mechanism fits with an end of the electromagnetic tripping iron core, under the influence of one or more of the reset key, bracket reset mechanism, bracket homing mechanism, and the electromagnetic tripping mechanism, the reset bracket is configured to slide between a first position and a second position to control the selectivity of the conductive assembly, the reset bracket is mounted to slide in a plane perpendicular to the pressing direction of the reset key, one of the pair of short-circuit conductive strips is held in the first guide slot of the reset bracket and the other of the pair of short-circuit conductive strips is held in the second guide slot of the reset bracket so that when the reset bracket slides from the first position to the second position the movable contacts of the pair of short circuit conductive strips move from the first position that disconnects electrical continuity between the power input side and the load side to the second position that connects electrical continuity between the power input side and the load side, the conductive movable contacts are configured respectively on the pair of short-circuit conductive strips facing the second position, the at least one support spring is positioned between the reset bracket and the side of the short-circuit conductive strip without the conductive movable contacts, the pair of power input connection assemblies are on one side of the reset bracket and the pair of wiring output assemblies and the pair of receptacle output assemblies are on a second side of the reset bracket, a portion of the pair of wiring output assemblies, through the third short-circuit conductor, at least one of the pair of conductive pads and at least one of the pair of the receptacle output assemblies, are configured to form a selective electrical connection, the actuator bracket homing mechanism is configured to keep the movable contacts of the pair of conductive pads in a normally-closed state with the output stationary contacts of the pair of wiring output assemblies, the electromagnetic generating device controls the electromagnetic actuator bracket to selectively disconnect the movable contacts of the conductive pads from the pair of output stationary contacts, the third short-circuit conductor and the fourth short-circuit conductor are configured in a normally open state, when a reverse wire condition exists, the electromagnetic generating device is configured to close the normally open third short-circuit conductor and fourth short-circuit conductor and is further configured to open the normally-closed first short-circuit conductor and second short-circuit conductor, at least a portion of the power supply sub-circuit of the electromagnetic generating device bridges over the wiring output assembly, the reed switch of the power supply sub-circuit links with the reset key, and the reed switch of the power supply sub-circuit closes in the tripped state and opens in the reset state and in the resetting process.

2. The ground fault circuit interrupter of claim 1, further comprising:

a reset key comprising a reset pole, the reset pole extending perpendicular to a long axis of the reset bracket, the reset pole comprising a projecting incline on a first side; and a reset linkage mechanism, comprising:

reset sliding block; and reset sliding block reset mechanism configured to provide a sliding force to the reset sliding block such that the reset sliding block slides toward a reset key pressing direction, wherein at least a portion of the reset pole is surrounded by the reset linkage mechanism, wherein the reset bracket is positioned proximal to the first side of the reset pole, wherein the reset bracket comprises a reset incline facing the projecting incline, wherein the reset incline and the projecting incline overlap along a motion trail, wherein the shape of the reset incline is complementary to the shape of the projecting incline, and wherein the reset linkage mechanism is provided between the reset sliding block and the reset pole.

3. The ground fault circuit interrupter of claim 2, wherein:

an end of the electromagnetic tripping iron core is proximal to the reset pole and is configured to move back and forth in a direction perpendicular to the reset key pressing direction, the reset locking mechanism comprises a reset locking hole in the reset pole, the reset locking hole is configured to intersect in a clearance fit with a centerline of the electromagnetic tripping iron core when the reset key is pressed and the interrupter is in a resettable condition, thereby forming the reset latching mechanism, the reset pole further comprises an incline that intersects with a centerline of the electromagnetic tripping iron core when the interrupter is in a tripped condition, and the reset sliding block further comprises at least one outer wall with a linking hole, the linking hole passing inward to a central hole, the linking hole configured to align with the reset locking hole such that a portion of the electromagnetic tripping iron core can be selectively passed through each of the linking hole and the reset locking hole to form the reset linkage clutching mechanism.

4. The ground fault circuit interrupter of claim 3, wherein:

the reset bracket is positioned downward from the reset key, and is slidable in a plane between the first position and the second position, the reset key is generally quandrangular in shape, the first guide slot and the second guide slot are slot joints parallel with the sliding plane of the reset bracket, the reset incline is in a central location of the reset bracket facing downwardly and the first guide slot is upward to a first side of the reset incline and the second guide slot is upward to a second side of the reset incline, the reset sliding block has a cylindrical component with penetrating internal holes provided in an axial direction, the reset sliding block is clearance-fitted over the reset pole of the reset key, the reset sliding block comprises an upper end face with a compression spring pressed against the face, thereby comprising the reset sliding block reset mechanism, the reset sliding block further comprises a convex block on a side facing the reset bracket, the convex block comprises an upper side with an incline facing the pressing direction of the reset key, thereby comprising the projecting incline, the electromagnetic tripping mechanism is provided to one side of the reset bracket, the sliding direction of the electromagnetic tripping iron core is perpendicular to the reset key pressing direction, when the interrupter is in a tripped state, the axis of the electromagnetic tripping iron core aligns with the incline below the reset locking hole, the reed switch comprises a pair of conductive reeds with contacts provided at facing ends of the reeds, the pair of conductive reeds are positioned one above the other, with the lower reed having an end proximal to a lower end face of the reset pole, thereby comprising the link with the reset key.

5. The ground fault circuit interrupter of claim 4, further comprising:

a reset bracket seat comprising:

four vertical side walls;

an internal cavity; and a horizontal sliding face on an upper portion; and a middle frame comprising an upper surface and a lower surface, the lower surface comprising a concave cavity with concave grooves that receive an upper portion of the reset bracket and that support a sliding motion of the reset bracket;

wherein:

the reset sliding block is positioned in the internal cavity with a clearance fit, the reset bracket is positioned slidably on the sliding face and below the middle frame, and the reset bracket further comprises convex ribs that fit in to the concave grooves, thereby forming a guide mechanism.

6. The ground fault circuit interrupter of claim 2, wherein:

an end of the electromagnetic tripping iron core is proximal to the reset pole and is configured to move back and forth in a direction perpendicular to the pressing direction of the reset key, the reset pole further comprises a reset hook and an incline, and the incline is configured to selectively contact the end of the electromagnetic tripping iron core, a centerline of the reset hook and a centerline of the reset key intersect with a centerline of the electromagnetic tripping iron core, the reset hook is configured to selectively clearance-fit with the end of the electromagnetic tripping iron core to form a reset latching mechanism, the reset sliding block further comprises at least one outer wall with a linking hole, the linking hole passing inward to a central hole, the linking hole configured to align with the reset locking hole such that a portion of the electromagnetic tripping iron core can be selectively passed through each of the linking hole and the reset locking hole to form the reset linkage clutching mechanism.

7. The ground fault circuit interrupter of claim 6, wherein:

the reset bracket is positioned downward from the reset key, and is slidable in a plane between the first position and the second position, the reset key is generally quandrangular in shape, the first guide slot and the second guide slot are slot joints parallel with the sliding plane of the reset bracket, the reset incline is in a central location of the reset bracket facing downwardly and the first guide slot is upward to a first side of the reset incline and the second guide slot is upward to a second side of the reset incline, the reset sliding block has a cylindrical component with penetrating internal holes provided in an axial direction, the reset sliding block is clearance-fitted over the reset pole of the reset key, the reset sliding block comprises an upper end face with a compression spring pressed against the face, thereby comprising the reset sliding block reset mechanism, the reset sliding block further comprises a convex block on a side facing the reset bracket, the convex block comprises an upper side with an incline facing the pressing direction of the reset key, thereby comprising the projecting incline, the electromagnetic tripping mechanism is provided to one side of the reset bracket, the sliding direction of the electromagnetic tripping iron core is perpendicular to the reset key pressing direction, when the interrupter is in a tripped state, the axis of the electromagnetic tripping iron core aligns with the incline below the reset locking hole, the reed switch comprises a pair of conductive reeds with contacts provided at facing ends of the reeds, the pair of conductive reeds are positioned one above the other, with the lower reed having an end proximal to a lower end face of the reset pole, thereby comprising the link with the reset key.

8. The ground fault circuit interrupter of claim 7, further comprising:

a reset bracket seat comprising:

four vertical side walls;

an internal cavity;

a horizontal sliding face on an upper portion;

a guide clip at a first end of the horizontal sliding face; and a limit stop at a second, opposite end of the horizontal sliding face, wherein:

the reset sliding block is positioned in the internal cavity of the reset bracket seat with a clearance fit, the reset bracket is positioned slidably on the sliding face and between the guide clip and the sliding face, the reset bracket further comprises a guide slot, and the guide slot clearance-fits with the guide clip so that the guide clip is located in the guide slot to comprise a guide mechanism positioned between the reset bracket and the reset bracket seat, and the limit stop is configured to prevent the reset bracket from sliding off the horizontal face.

9. The ground fault circuit interrupter of claim 7, further comprising:

a reset bracket seat comprising:

four vertical side walls;

an internal cavity;

a horizontal sliding face on an upper portion; and a limit stop at a second, opposite end of the horizontal sliding face, wherein:

the reset sliding block is positioned in the internal cavity of the reset bracket seat with a clearance fit, the reset bracket is positioned slidably on the sliding face, and the limit stop is configured to prevent the reset bracket from sliding off the horizontal face.

10. The ground fault circuit interrupter of claim 3, wherein the reset sliding block further comprises a second outer wall with a second linking hole, the second linking hole passing inward to the central hole, the second linking hole configured to align with the reset locking hole such that a portion of the electromagnetic tripping iron core can be selectively passed through each of the first linking hole, the second linking hole and the reset locking hole to form the reset linkage clutching mechanism.

11. The ground fault circuit interrupter of claim 6, wherein the reset sliding block further comprises a second outer wall with a second linking hole, the second linking hole passing inward to the central hole, the second linking hole configured to align with the reset locking hole such that a portion of the electromagnetic tripping iron core can be selectively passed through each of the first linking hole, the second linking hole and the reset locking hole to form the reset linkage clutching mechanism.

12. The ground fault circuit interrupter of claim 1, wherein:

the electromagnetic generating device comprises an electromagnetic coil and an iron core in the center of the electromagnetic coil, the electromagnetic actuator bracket comprises insulation plates, the pair of conductive pads are sandwiched in the insulation plates, a middle section of the insulation plates comprises a pivot point, thereby forming a seesaw structure above the electromagnetic generating device, the insulation plates comprise an armature adjacent to the iron core, a first pad of the pair of conductive pads extends below a leftmost output stationary contact and a second pad of the pair of conductive pads extends below a rightmost output stationary contact, the actuator bracket homing mechanism comprises a tension spring between an end of the electromagnetic actuator bracket and a mounting bracket of the electromagnetic generating device, the tension spring is configured to bias the conductive pads upwards to provide a normally-closed state between the movable contacts of the conductive pads and the output stationary contacts, the reed switch comprises a pair of opposed conductive reeds with movable contacts provided at facing opposing ends, the electromagnetic actuator bracket comprises an end that swings, and the holding switch is positioned in a swinging trail of the swinging end thereby forming the link between the holding switch and the electromagnetic actuator bracket.

13. A ground fault circuit interrupter for a receptacle having a power input side and a load side, comprising:

a reset key with a pressing direction;

a reset mechanism;

an electromagnetic tripping mechanism;

a conductive assembly configured from the power input side to the load side, the conductive assembly configured to selectively connect or disconnect electrical continuity between the power input side and the load side, the conductive assembly comprising:

a first conductor pair connecting the power input side to a receptacle output assembly on the load side, comprising a first phase conductor and a first neutral conductor, a first normally open switch on the first phase conductor, and a second normally open switch on the first neutral conductor, a second conductor pair connecting the power input side to a load output assembly on the load side, comprising a second phase conductor and a second neutral conductor, a first normally closed switch on the second phase conductor and a second normally closed switch on the second neutral conductor, a first short-circuit conductive strip comprising a first movable contact configured to selectively electrically connect the first phase conductor to the second phase conductor, and a second short-circuit conductive strip comprising a second movable contact configured to selectively electrically connect the first neutral conductor to the second neutral conductor, and a reverse wiring protection device comprising:

an electromagnetic generating device having a power supply sub-circuit; and an electromagnetic actuator bracket configured to selectively close first normally open switch and second normally open switch and further configured to open first normally closed switch and second normally closed switch, wherein:

the electromagnetic generating device controls the electromagnetic actuator bracket to selectively close and open first normally closed switch and second normally closed switch.

14. The ground fault circuit interrupter of claim 13, wherein:

the electromagnetic generating device comprises an electromagnetic coil and an iron core in the center of the electromagnetic coil, the electromagnetic actuator bracket comprises insulation plates, the first normally closed switch and the second normally closed switch are sandwiched in the insulation plates, a middle section of the insulation plates comprises a pivot point, thereby forming a seesaw structure above the electromagnetic generating device, the insulation plates comprise an armature adjacent to the iron core, an actuator bracket homing mechanism comprises a tension spring between an end of the electromagnetic actuator bracket and a mounting bracket of the electromagnetic generating device, the tension spring is biased to provide the normally-closed state of the first normally closed switch and the second normally closed switch, the power supply sub-circuit is configured with a reed switch connected in series, the reed switch comprises a pair of opposed conductive reeds with movable contacts provided at facing opposing ends, the reverse wiring protection device comprises a normally open holding switch connected in parallel with the reed switch and the normally open holding switch is linked with the electromagnetic actuator bracket, and the electromagnetic actuator bracket comprises an end that swings, and the holding switch is positioned in a swinging trail of the swinging end thereby forming the link between the holding switch and the electromagnetic actuator bracket.

15. The ground fault circuit interrupter of claim 13, wherein:

the reset key comprises a reset locking mechanism having a motion trail that intersects with a central longitudinal axis of an electromagnetic tripping iron core;

the reset mechanism comprises:

a reset bracket comprising:

a first guide slot on a first side; and a second guide slot on a second side;

a bracket reset mechanism comprising at least one support spring; and a bracket homing mechanism that is biased to push the reset bracket in a sliding direction in to a first position;

a reset linkage mechanism between the reset key and the reset bracket, the reset linkage mechanism configured to link a reset homing action and the sliding of the reset bracket;

a reset linkage clutching mechanism configured to control the reset linkage mechanism when the interrupter resets.

16. The ground fault circuit interrupter of claim 15, wherein the electromagnetic tripping mechanism comprises:

a coil rack with a central hole;

an electromagnetic tripping coil wound around the coil rack;

the electromagnetic tripping iron core; and an iron core reset spring;

wherein:

the electromagnetic tripping iron core and the iron core reset spring are positioned in the central hole of the coil rack with a clearance fit, the electromagnetic tripping iron core is configured to slide perpendicular to the pressing direction of the reset key, the reset locking mechanism fits with an end of the electromagnetic tripping iron core, under the influence of one or more of the reset key, bracket reset mechanism, bracket homing mechanism, and the electromagnetic tripping mechanism, the reset bracket is configured to slide between a first position and a second position to control the electrical connectivity of the conductive assembly, the reset bracket is mounted to slide in a plane perpendicular to the pressing direction of the reset key, the first short-circuit conductive strip is held in the first guide slot of the reset bracket and the second short-circuit conductive strip is held in the second guide slot of the reset bracket so that when the reset bracket slides from the first position to the second position the first and second short circuit conductive strips move from the first position that disconnects electrical continuity between the first phase conductor and the second phase conductor and move to the second position that connects electrical continuity between the first phase conductor and the second phase conductor, the at least one support spring is positioned between the reset bracket and a side of one of the first or second short-circuit conductive strips, the pair of power input connection assemblies are on one side of the reset bracket and the pair of wiring output assemblies and the pair of receptacle output assemblies are on a second side of the reset bracket.

17. The ground fault circuit interrupter of claim 15, further comprising:

a reset key comprising a reset pole, the reset pole extending perpendicular to a long axis of the reset bracket, the reset pole comprising a projecting incline on a first side; and a reset linkage mechanism, comprising:

reset sliding block; and reset sliding block reset mechanism configured to provide a sliding force to the reset sliding block such that the reset sliding block slides toward a reset key pressing direction, wherein at least a portion of the reset pole is surrounded by the reset linkage mechanism, wherein the reset bracket is positioned proximal to the first side of the reset pole, wherein the reset bracket comprises a reset incline facing the projecting incline, wherein the reset incline and the projecting incline overlap along a motion trail, wherein the shape of the reset incline is complementary to the shape of the projecting incline, and wherein the reset linkage mechanism is provided between the reset sliding block and the reset pole.

18. A ground fault circuit interrupter for a receptacle having a power input side and a load side, comprising:

a first switch with first actuation means, a second switch with second actuation means, a third switch with third actuation means;

a first conductor pair comprising a phase and a neutral, the first conductor pair electrically connected to the first switch and further configured to selectively electrically connect to the second switch;

a second conductor pair comprising a phase and a neutral, the second conductor pair connected to face terminals of the receptacle and further configured to selectively electrically connect to the second switch; and a third conductor pair comprising a phase and a neutral, the third conductor pair electrically connected to load terminals of the receptacle and electrically connected to the third switch, wherein:

the actuation means of the second switch and the actuation means of the third switch are linked so that when the second switch is open, the third switch is closed, and when the third switch is open, the second switch is closed, when the first switch is open and the second switch is open, the second conductor pair and the third conductor pair are electrically connected through the third switch, when the first switch is open and the second switch is closed, the second conductor pair is electrically connected to the first conductor pair and the third conductor pair is electrically isolated from the first conductor pair and the second conductor pair, and when the first switch is closed, the second switch is open, and the third switch is closed, the first conductor pair is electrically connected to both the second conductor pair and the third conductor pair.

* * * * *